US012673847B2

(12) United States Patent
Takemoto

(10) Patent No.: US 12,673,847 B2
(45) Date of Patent: Jul. 7, 2026

(54) WIRE ROPE INSPECTION DEVICE

(71) Applicant: SHIMADZU CORPORATION, Kyoto (JP)

(72) Inventor: Hajime Takemoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 955 days.

(21) Appl. No.: 17/752,465

(22) Filed: May 24, 2022

(65) Prior Publication Data

US 2023/0053507 A1 Feb. 23, 2023

(30) Foreign Application Priority Data

Aug. 23, 2021 (JP) ................................. 2021-135610

(51) Int. Cl.
*B66B 7/12* (2006.01)
*G01N 27/83* (2006.01)

(52) U.S. Cl.
CPC ............. *B66B 7/123* (2013.01); *G01N 27/83* (2013.01)

(58) Field of Classification Search
CPC ................................. B66B 7/123; G01N 27/83
USPC ........................................................ 187/393
See application file for complete search history.

(56) References Cited

U.S. PATENT DOCUMENTS

| | | | | | |
|---|---|---|---|---|---|
| 8,476,898 | B2 * | 7/2013 | Nishiyori | ................ | B66B 7/123 |
| | | | | | 324/238 |
| 10,222,351 | B2 * | 3/2019 | Kondoh | ................ | G01N 27/82 |

| | | | | | |
|---|---|---|---|---|---|
| 11,358,836 | B2 * | 6/2022 | Iijima | ..................... | B66B 7/123 |
| 2007/0090834 | A1 * | 4/2007 | Osada | ..................... | B66B 7/123 |
| | | | | | 324/240 |
| 2010/0244821 | A1 * | 9/2010 | Nishiyori | ................ | B66B 7/123 |
| | | | | | 324/263 |
| 2013/0147471 | A1 * | 6/2013 | Weischedel | ........ | G01N 27/9006 |
| | | | | | 324/238 |
| 2015/0239708 | A1 * | 8/2015 | Palazzola | .............. | B66B 5/0031 |
| | | | | | 187/390 |
| 2017/0038338 | A1 * | 2/2017 | Kondoh | ................. | G01N 27/82 |
| 2018/0202972 | A1 * | 7/2018 | Omi | ........................ | G01N 27/83 |
| 2019/0293603 | A1 * | 9/2019 | Itoi | ......................... | G01N 27/83 |
| 2020/0002133 | A1 * | 1/2020 | Hirota | ..................... | B66D 1/54 |
| 2020/0300811 | A1 * | 9/2020 | Hashime | ............... | G01N 27/83 |

(Continued)

FOREIGN PATENT DOCUMENTS

| | | | | | |
|---|---|---|---|---|---|
| FI | 126173 | B | * | 7/2016 | ............. B66B 7/123 |
| JP | 2011257183 | A | * | 12/2011 | |

(Continued)

OTHER PUBLICATIONS

Extended European Search Report (EESR) dated Oct. 27, 2022 for corresponding European patent application No. EP 22169880.6.

(Continued)

*Primary Examiner* — Christina M Schreiber
(74) *Attorney, Agent, or Firm* — Muir Patent Law, PLLC

(57) ABSTRACT

This wire rope inspection device is provided with an urging unit for urging a detection unit in a direction to approach a wire rope by an elastic force to an inspection position at which the detection unit is arranged at a time of an inspection operation for inspecting the wire rope and a drive unit for moving the detection unit in a direction away from the wire rope to a normal operation position at which the detection unit is arranged at a time of a normal operation.

14 Claims, 10 Drawing Sheets

(56) References Cited

U.S. PATENT DOCUMENTS

| | | | | |
|---|---|---|---|---|
| 2021/0107770 A1* | 4/2021 | Iijima | | B66B 5/12 |
| 2021/0380372 A1* | 12/2021 | Iijima | | B66B 7/123 |
| 2022/0212894 A1* | 7/2022 | Ito | | G01N 27/83 |
| 2023/0018455 A1* | 1/2023 | Takemoto | | G01N 27/9093 |
| 2023/0034506 A1* | 2/2023 | Sonntag | | G01N 27/83 |
| 2023/0053507 A1* | 2/2023 | Takemoto | | G01N 27/83 |
| 2023/0072626 A1* | 3/2023 | Tonami | | G01R 33/02 |
| 2023/0273155 A1* | 8/2023 | Takami | | G01N 27/83 |

FOREIGN PATENT DOCUMENTS

| | | | | | |
|---|---|---|---|---|---|
| JP | 2019015656 A | * | 1/2019 | | |
| JP | 6766230 B1 | * | 10/2020 | | |
| JP | 2023158971 A | * | 10/2023 | | |
| JP | 7448037 B2 | * | 3/2024 | | B66B 5/02 |
| JP | 2025040333 A | * | 3/2025 | | |
| KR | 101419629 B1 | * | 7/2014 | | G01N 27/83 |
| WO | WO-2015166533 A1 | * | 11/2015 | | G01N 27/82 |
| WO | WO-2019171667 A1 | * | 9/2019 | | G01N 27/82 |
| WO | WO-2022054314 A1 | * | 3/2022 | | G01N 27/82 |
| WO | WO-2022118494 A1 | * | 6/2022 | | G01N 27/82 |
| WO | WO-2022118582 A1 | * | 6/2022 | | B66B 5/02 |

OTHER PUBLICATIONS

Notice of Reasons for Refusal dated Dec. 3, 2024 for corresponding Japanese Patent Application No. 2021-135610.
NTN One-Way Clutch (NTN electronic catalog B296) with machine translation, exact publication date unknown, found Jan. 2021.
TOK Rotary Damper (Product Information) with machine translation, exact publication date unknown, found Jan. 2021.
Third Office Action dated Dec. 31, 2025, issued in relation to the corresponding Chinese Patent Application No. 202210849534.6.
Second Office Action dated Sep. 2, 2025 for corresponding Chinese Patent Application No. 202210849534.6.

* cited by examiner

*FIG.7*    At the Time of Normal Operation
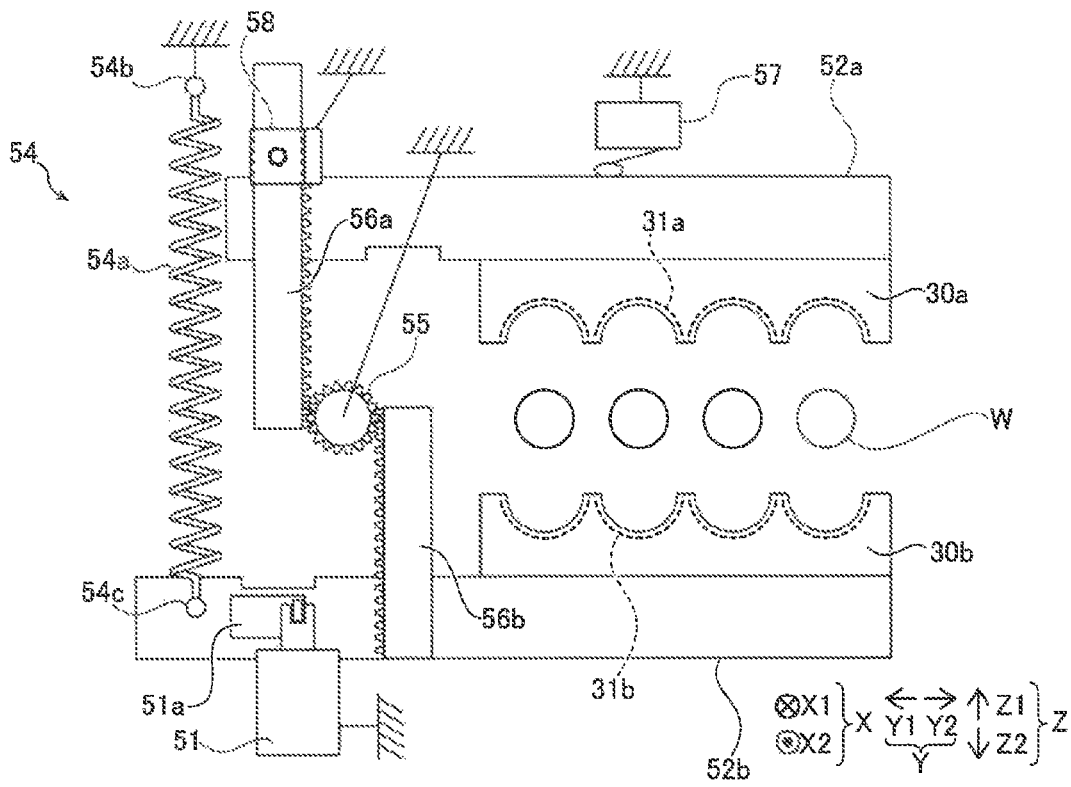
*FIG.8*    At the Time of Inspection Operation
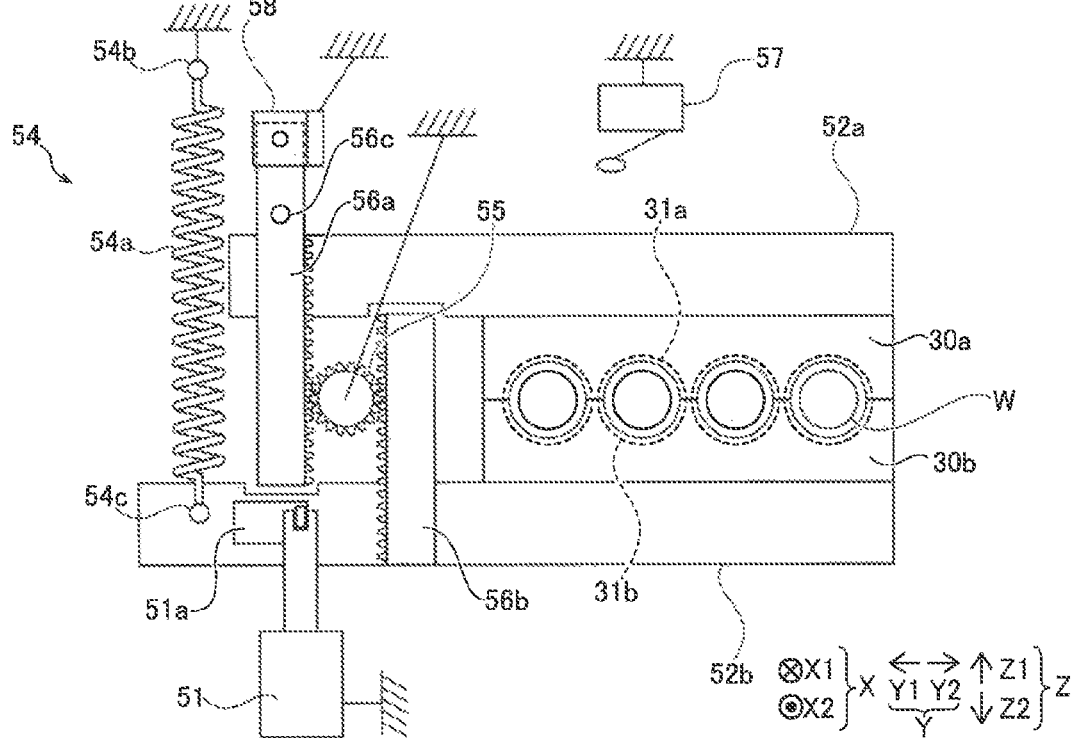

At the Time of Normal Operation

At the Time of Inspection Operation (A)          (B)

WIRE ROPE INSPECTION DEVICE

CROSS-REFERENCE TO RELATED APPLICATIONS

This application claims priority to Japanese Application No. 2021-135610, entitled "WIRE ROPE INSPECTION DEVICE," filed on Aug. 23, 2021, and invented by Hajime Takemoto, the entire contents of which being hereby incorporated by reference.

BACKGROUND OF THE INVENTION

The present invention relates to a wire rope inspection device.

DESCRIPTION OF THE RELATED ART

Conventionally, a wire rope inspection device for detecting a change in a magnetic flux of a wire rope by a detection coil is known. Such a device is disclosed, for example, in International Publication No. WO 2019/171667.

The above-described International Publication No. WO 2019/171667 discloses a wire rope inspection device (magnetic body inspection device) equipped with an excitation unit provided with respect to a wire rope (magnetic body) and a detection coil for detecting the magnetic flux (magnetic field) of the wire rope. The wire rope inspection device described in International Publication No. WO 2019/171667 as described above is configured to detect the change in the magnetic flux of the wire rope caused by applying a magnetic flux by an excitation unit, by a detection coil.

Here, although not described in the above-described International Publication No. WO 2019/171667, in a wire rope inspection device, it is conceivable to configure as follows. That is, at the time of a normal operation at which no inspection is performed, the detection coil is moved away from the wire rope so that the wire rope can be prevented from coming into contact with the detection coil. Further, at the time of an inspection operation at which an inspection is performed, the detection coil is moved to approach the wire rope so that the inspection can be performed with high precision.

In a case where the wire rope is configured as described above, when the detection coil is installed in a location, such as, e.g., the inside of a housing of the device in which the wire rope serving as an inspection target is used, it is conceivable to move the detection coil by remote control using a driving force by a motor or the like when the detection coil is brought close to the wire rope.

However, in a case where a driving force of a motor or the like is used to arrange the detection coil at the inspection position at which the wire rope is inspected, it is necessary to control the driving of the motor or the like for the purpose of controlling the movement of the detection coil. In such a case, in order to acquire the detection result by the detection coil with high precision, the detection coil is required to approach the wire rope as close as possible, and therefore, the movement of the detection coil is required to be controlled finely. For this reason, in order to finely control the movement of the detection coil, it is conceivable that the processing load of the control processing increases. Therefore, it is desirable that the detection unit can be easily arranged to approach the wire rope as close as possible when the detection coil (detection unit) for detecting the magnetic flux of the wire rope is moved remotely.

SUMMARY OF THE INVENTION

The present invention has been made to solve the aforementioned problems. One object of the present invention is to provide a wire rope inspection device capable of easily arranging a detection unit so as to approach as close as possible to a wire rope when remotely moving the detection unit for detecting the magnetic flux of the wire rope.

A wire rope inspection device according to one aspect of the present invention is provided with:

an excitation unit configured to apply a magnetic flux to a wire rope which is an inspection target;

a detection unit configured to detect a magnetic flux of the wire rope to which the magnetic flux has been applied by the excitation unit;

an urging unit configured to urge the detection unit in a direction to approach the wire rope by an elastic force to an inspection position at which the detection unit is arranged at a time of an inspection operation for inspecting the wire rope; and a drive unit configured to move the detection unit in a direction away from the wire rope to a normal operation position at which the detection unit is arranged at a time of a normal operation.

In the wire rope inspection device according to one aspect of the present invention, as described above, an urging unit is provided. The urging unit is configured to urge the detection unit in a direction to approach the wire rope by an elastic force to an inspection position at which the detection unit is arranged at the time of an inspection operation for inspecting the wire rope. With this, since it is possible to move the detection unit to the inspection position at which the inspection is performed by being urged by the urging unit, without controlling the movement of the detection unit, it is possible to place the detection unit so as to approach as close as possible to the wire rope by urging the detection unit by the elastic force of the urging unit. Therefore, the detection unit can be arranged so as to approach as close as possible to the wire rope without finely controlling the movement of the detection unit. As a consequence, it is possible to suppress an increase in the processing load of the control processing. Therefore, when moving the detection unit for detecting the magnetic flux of the wire rope by a remote operation, the detection unit can be easily arranged to approach as close as possible to the wire rope. Further, at the time of the normal operation, there is no need to finely control the arrangement of the detection unit. For this reason, it is possible to easily arrange the detection unit at the normal operation position by moving the detection unit against the elastic force (urging force) of the urging unit by the drive unit in a direction away from the wire rope to the normal operation position at which the detection unit is arranged at the time of the normal operation.

BRIEF DESCRIPTION OF THE DRAWINGS

FIG. 7 is a diagram showing the arrangement of a detection unit and a drive mechanism at the time of a normal operation by a wire rope inspection device according to a first embodiment.

FIG. 8 is a diagram showing the arrangement of a detection unit and a drive mechanism at the time of an inspection operation by a wire rope inspection device according to a first embodiment.

In FIG. 13, (B) shows a diagram for explaining a one-way clutch according to a second embodiment, which is a cross-sectional view taken along the line 400-400 in (A) of FIG. 13.

DESCRIPTION OF THE PREFERRED EMBODIMENTS

Hereinafter, some embodiments in which the present invention is embodied will be described with reference to the attached drawings.

First Embodiment

First, with reference to FIGS. 1 to 8, the configuration of a wire rope inspection system 100 and a wire rope inspection device 101 according to a first embodiment of the present invention will be described. In the following description, note that the term "perpendicular" means intersecting at an angle of 90 degrees or nearly 90 degrees. Further, the term "parallel" includes parallel and substantially parallel.
(Configuration of Wire Rope Inspection System)

Figure 1:
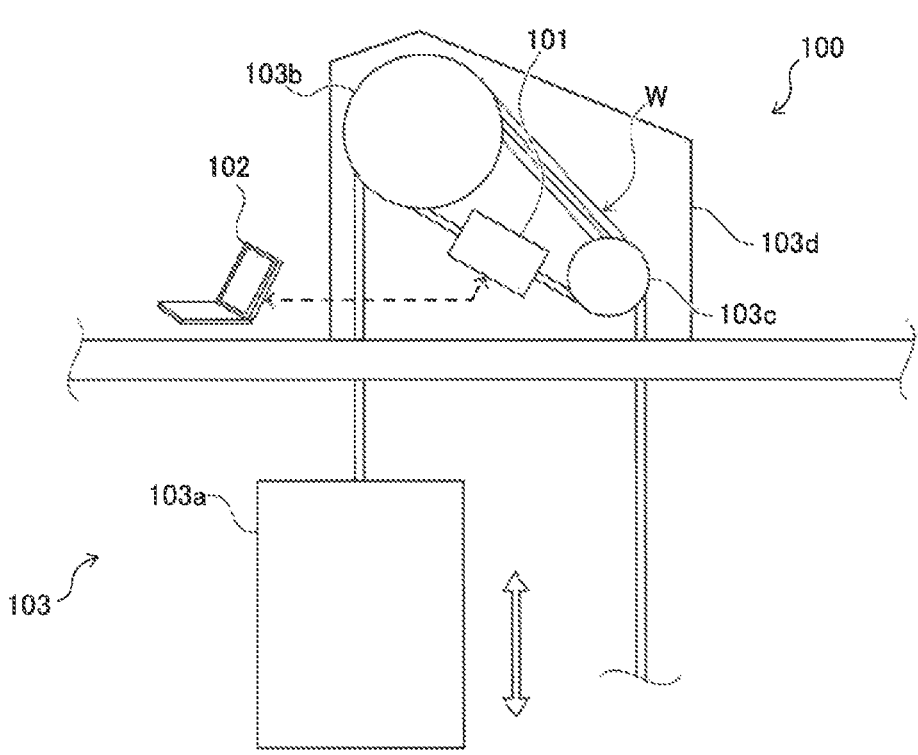
FIG. 1 is a schematic diagram showing an entire configuration of a wire rope inspection system according to a first embodiment.

As shown in FIG. 1, the wire rope inspection system 100 is provided with a wire rope inspection device 101 and a processing device 102. The wire rope inspection system 100 inspects the wire rope W provided on an elevator 103. Specifically, the wire rope inspection system 100 is a system for inspecting abnormalities (such as, e.g., wire disconnection) of the wire rope W of the elevator 103, which is the inspection target.

In addition, the wire rope inspection system 100 is a system capable of confirming abnormalities of the wire rope W that are difficult to visually confirm, by a total magnetic flux method that measures the magnetic flux inside the wire rope W. When the wire rope W contains abnormal portions (e.g., wire disconnection, wall thinning, rust), the magnetic flux in the abnormal portion differs from that in the normal portion. The total magnetic flux method is a method capable of measuring abnormal portions inside the wire rope W, unlike the method to measure the leakage magnetic flux from the abnormal portions on the surface of the wire rope W. Further, the wire rope inspection system 100 is configured to perform (initiate) the inspection of the wire rope W, based on the input operation by the inspection operator to the processing device 102.
(Configuration of Elevator)

Figure 2:
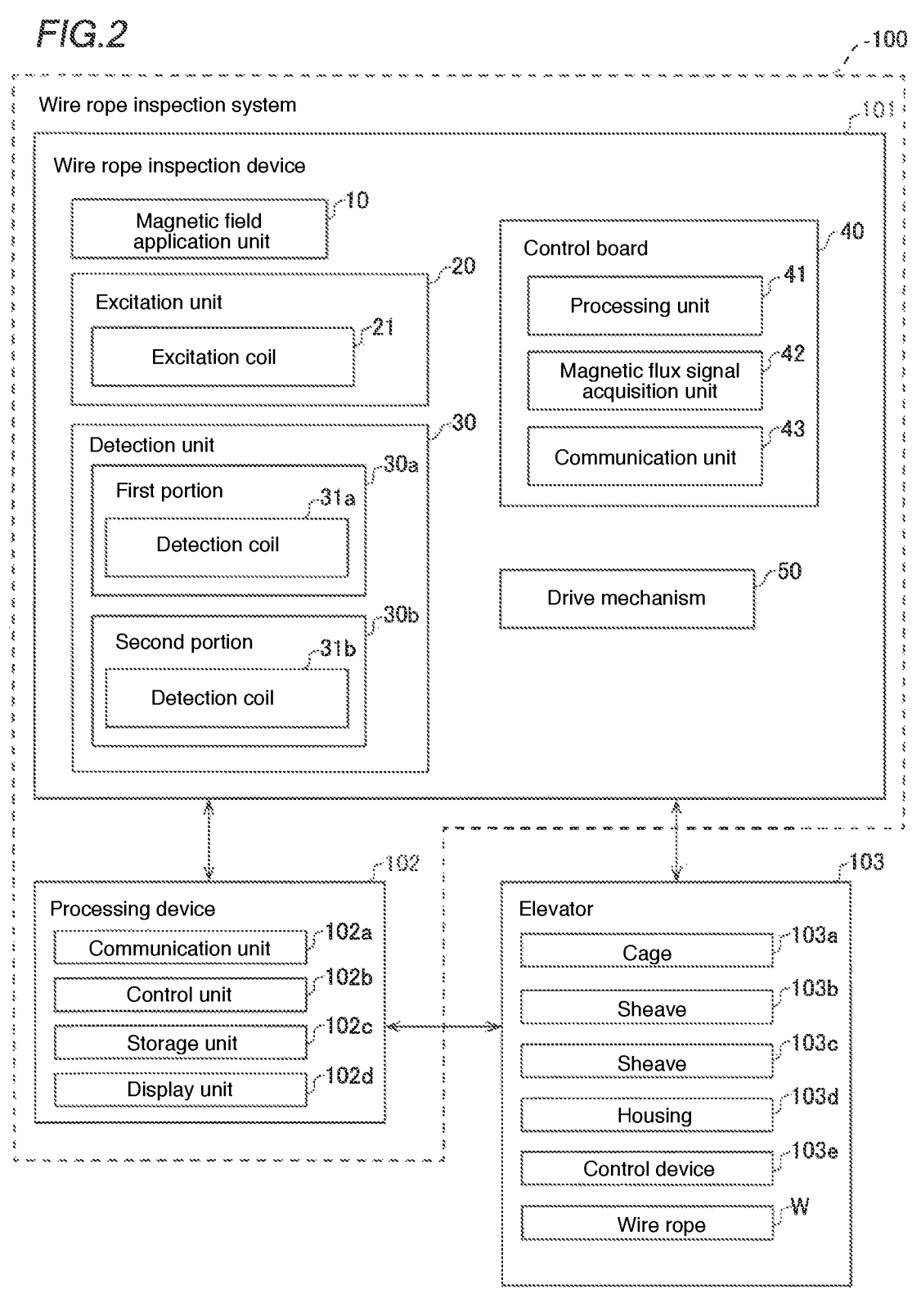
FIG. 2 is a block diagram showing an entire configuration of a wire rope inspection system according to a first embodiment.

As shown in FIGS. 1 and 2, the elevator 103 is provided with a cage 103a, a sheave 103b, a sheave 103c, a housing 103d, a control device 103e, and a wire rope W. The elevator 103 is configured to vertically move the cage 103a loading people, loads and the like by rotating the sheave 103b (pulley) provided to the winding machine to wind up the wire rope W. The elevator 103 is, for example, a double-wrap (full-wrap) rope-type elevator provided with two sheaves, i.e., the sheave 103b and the sheave 103c.

The double-wrap system is a structure in which the wire rope W is put on the sheave 103b twice by returning the wire rope W guided from the sheave 103b of the winding machine to the sheave 103c which is a deflector wheel to the sheave 103b of the winding machine again. The sheave 103b and the sheave 103c are arranged inside the housing 103d.

The control device 103e includes a control board for controlling the operation of each part of the elevator 103. Further, the control device 103e includes a radio communication module and the like and is configured to be able to communicate with the wire rope inspection device 101 and the processing device 102. The control device 103e is configured to change the moving speed (operating speed) of the cage 103a of the elevator 103 at the time of the normal operation (normal operation mode) to be operated in a state of loading people and/or loads therein and at the time of an inspection operation (inspection operation mode) to inspect the wire rope W, based on the input operation to the processing device 102.

For example, at the time of the normal operation, the operation speed (moving speed of the wire rope W) is about 500 m/min. At the time of the inspection operation, the operation speed is about 10 m/min or more and 40 m/min or less. Further, the vibration of the wire rope W increases as the operation speed of the elevator 103 increases.

The wire rope W is formed by braiding (e.g., strand braiding) magnetic wire materials and is a magnetic body made of an elongated member. The state (presence or absence of damage or the like) of the wire rope W is inspected by the wire rope inspection device 101 in order to prevent the disconnection of the wire rope W due to degradation from occurring. As a result of the measurement of the magnetic flux in the wire rope W, the wire rope W determined that the degree of degradation has exceeded a predetermined criterion will be replaced by the inspection operator.

In the example shown in FIG. 1, for convenience, only one wire rope W is illustrated, but the elevator 103 is provided with a plurality of wire ropes W. For example, the elevator 103 is provided with four wire ropes W (see FIGS. 7 and 8).

The wire rope W is arranged so as to extend in the X-direction (see FIG. 3) at the position of the wire rope inspection device 101. The wire rope inspection device 101 measures the magnetic flux in the wire rope W in the state of moving along the extending direction (X-direction) of the wire rope W, along the surface of the wire rope W.

Specifically, like the wire rope W used in the elevator 103, the measurement of the magnetic flux in the wire rope W is performed by the wire rope inspection device 101 while moving the wire rope W in the X-direction by the winding machine. With this, the wire rope inspection device 101 inspects the damage at each position of the wire rope W in the X-direction by measuring the magnetic flux at each position of the wire rope W in the X-direction.

(Configuration of Processing Device)

As shown in FIG. 2, the processing device 102 is provided with a communication unit 102a, a control unit 102b, a storage unit 102c, and a display unit 102d. For example, the processing device 102 displays the measurement result of the magnetic flux in the wire rope W by the wire rope inspection device 101 and analyzes based on the measurement result of the magnetic flux in the wire rope W by the wire rope inspection device 101.

Specifically, the processing device 102 is configured to acquire the detection signal from the detection coils 31a and 31b of the detection unit 30 which will be described later and determine the presence or absence of abnormalities of the wire rope W based on the acquired detection signal. The processing device 102 is, for example, a personal computer used by the inspection operator who inspects the wire rope W.

The communication unit 102a is configured to be able to communicate with the wire rope inspection device 101 and the control device 103e of the elevator 103. The communication unit 102a is a communication interface. Specifically, the communication unit 102a includes a wireless communication module capable of wireless communication by a wireless LAN, Bluetooth, and the like. The processing device 102 receives the measurement results (magnetic flux signals) of the wire rope W by the wire rope inspection device 101 via the communication unit 102a. The processing device 102 is configured to be able to acquire the information on the operation mode (information on the operation mode switching) of the elevator 103 from the elevator 103 (the control device 103e of the elevator 103).

The control unit 102b controls each part of the processing device 102. The control unit 102b includes a processor, such as, e.g., a CPU (Central Processing Unit), a memory, and the like. The control unit 102b analyzes the damages (abnormalities) of the wire rope W, such as, e.g., wire disconnection (wire breakage), based on the measurement results (detection signals) of the wire rope W received via the communication unit 102a.

The storage unit 102c is a storage medium including, for example, a flash memory, and stores (saves) the information on the measurement results of the wire rope W from the detection coils 31a and 31b, the analysis result of the measurement results of the wire rope W by the control unit 102b, and the like.

The display unit 102d is, for example, a liquid crystal monitor and displays the information on the measurement results of the wire rope W, the analysis result of the measurement results of the wire rope W by the control unit 102b, and the like.

(Configuration of Wire Rope Inspection Device)

Next, the configuration of the wire rope inspection device 101 according to the first embodiment will be described.

Figures 3, 4:
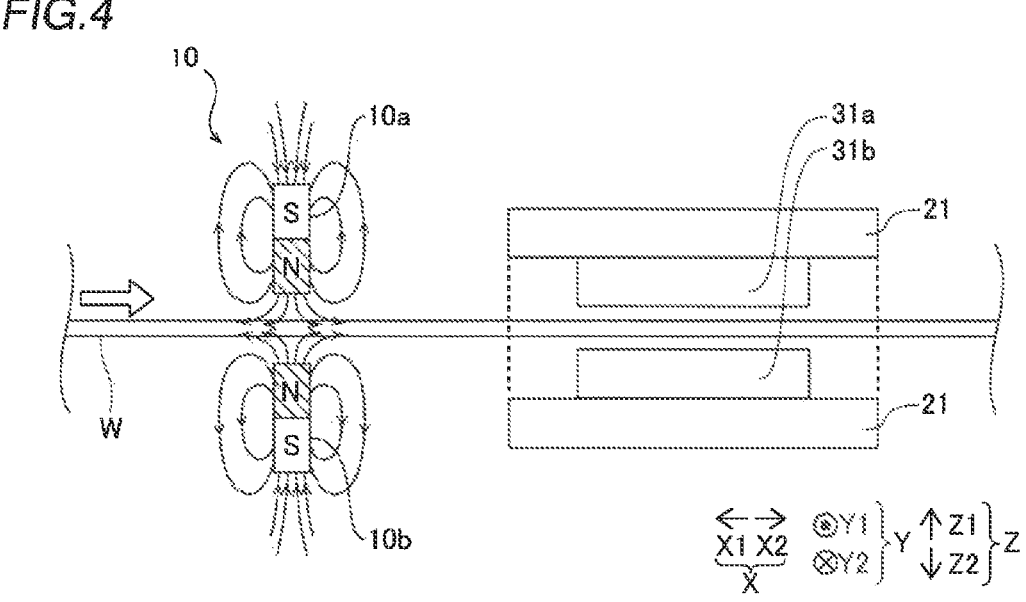
FIG. 3 is a schematic diagram showing a configuration of a wire rope inspection device according to a first embodiment.
FIG. 4 is a diagram showing the arrangement of a magnetic field application unit, an excitation unit, and a detection unit according to a wire rope inspection device according to a first embodiment.

As shown in FIGS. 2 and 3, the wire rope inspection device 101 is provided with a magnetic field application unit 10, an excitation unit 20, a detection unit 30, and a control board 40, as the configuration for measuring the magnetic flux (magnetic field) in the wire rope W.

In the first embodiment, the magnetic field application unit 10 aligns the direction of the magnetization of the wire rope W by applying a magnetic field to the wire rope W in advance. The magnetic field application unit 10 is, for example, a permanent magnet. Further, the excitation unit 20 is configured to apply a magnetic field (magnetic flux) to the wire rope W. Specifically, the excitation unit 20 includes an excitation coil 21 for exciting (vibrating) the magnetization state of the wire rope W. The details of the magnetic field application unit 10 and the excitation unit 20 will be described later.

In the first embodiment, the detection unit 30 is configured to detect the magnetic flux in the moving wire rope W in a state in which the wire rope W provided to the elevator 103 is moving along the extending direction (X-direction) of the wire rope W by driving the elevator 103.

The detection unit 30 includes a first portion 30a to be arranged on one side (Z1-direction side) in the direction (Z-direction) perpendicular to the extending direction (X-direction) of the wire rope W and a second portion 30b to be arranged on the other side (Z2-direction side). The detection unit 30 includes a detection coil 31a and a detection coil 31b arranged at the first portion 30a and the second portion 30b, respectively. In the first embodiment, the detection coils 31a and 31b detect the magnetic flux in the wire rope W to which a magnetic field has been applied by the excitation unit 20. Further, the detection coils 31a and 31b detect the magnetic flux of the inside of the wire rope W by a total magnetic flux method and output magnetic flux signals as detection signals. The details of the detection unit 30 will be described later.

The control board 40 includes a processing unit 41, a magnetic flux signal acquisition unit 42, and a communication unit 43.

The control board 40 controls the operation of the excitation unit 20 (excitation coils 21) based on the control signal from the processing unit 41. Further, the control board 40 controls each part of the wire rope inspection device 101 by the control processing by the processing unit 41. The processing unit 41 includes a processor, such as, e.g., a CPU, a memory, and an AD converter.

Further, the magnetic flux signal acquisition unit 42 acquires (receives) the magnetic flux signals from the detection unit 30 (the detection coils 31a and 31b). The magnetic flux signal acquisition unit 42 includes an amplifier. The magnetic flux signal acquisition unit 42 amplifies the acquired magnetic flux signal and outputs (transmits) the amplified signal to the processing unit 41.

The communication unit 43 is configured to be able to communicate with the processing device 102 and the control device 103e of the elevator 103. The communication unit 43 includes a wireless communication module capable of wireless communication by a wireless LAN, Bluetooth, and the like. The communication unit 43 outputs (transmits) the acquired magnetic flux signal to the processing device 102. Note that the connection between the wire rope inspection device 101 and the processing device 102 and the control device 103e of the elevator 103 via the communication unit 43 may be a wired connection.

<Abnormality Detection by Total Magnetic Flux Method>

Figure 5:
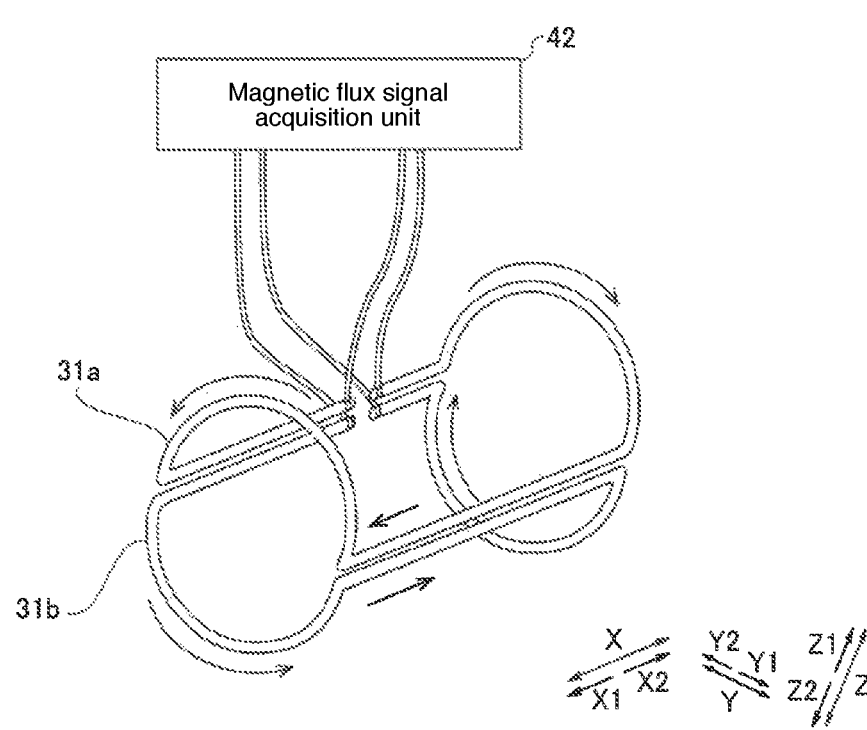
FIG. 5 is a schematic diagram for explaining a configuration of a detection coil of a detection unit.

As shown in FIGS. 4 and 5, at the time of the inspection operation (inspection operation mode), in the wire rope inspection system 100 according to the first embodiment, the wire rope W is guided to the wire rope inspection device 101 in the X2-direction by the rotational of the sheave 103b. The wire rope W guided to the wire rope inspection device 101 is first aligned in the magnetic field in advance by the magnetic field application unit 10. Then, the excitation coil 21 of the excitation unit 20 excites the state of magnetization of the wire rope W in which the magnetic field has been aligned (magnetized). Then, the detection coils 31a and 31b of the detection unit 30 detect the magnetic flux in the wire rope W in a state in which the state of the magnetization has been excited after being magnetized, by a total magnetic flux method.

That is, in the first embodiment, the detection coils 31a and 31b are configured to detect the magnetic flux in the wire rope W after the magnetic field has been applied in advance by the magnetic field application unit 10 (after being magnetized).

The magnetic field application unit 10 includes a pair of a magnetic field application unit 10a and a magnetic field application unit 10b arranged in a direction (Z-direction) perpendicular to the extending direction of the wire rope W. The pair of magnetic field application units 10a and 10b is arranged on both sides in the short direction (direction perpendicular to the extending direction of the wire rope W, i.e., the Z-direction) of the wire rope W so as to sandwich the wire rope W. Specifically, the magnetic field application unit 10a is arranged on the Z1-direction side of the wire rope W. The magnetic field application unit 10b is arranged on the Z2-direction side of the wire rope W.

The magnetic field application unit 10 is provided such that the N-pole (illustrated with diagonal lines) of the magnetic field application unit 10a oriented in the Z2-direction and the N-pole (illustrated with diagonal lines) of the magnetic field application unit 10b oriented in the Z1-direction are faced to each other across the wire rope W. The magnetic field application units 10a and 10b are configured to be able to apply a relatively strong magnetic field to substantially uniformly align the direction of the magnetization of the wire rope W.

Further, the excitation coil 21 is provided so as to collectively surround all of a plurality (four) wire ropes W along the extending direction (X-direction) of the wire rope W. The excitation coil 21 is provided so as to surround the outer side of the detection coils 31a and 31b with respect to the wire rope W. The excitation coil 21 generates a magnetic flux (magnetic field) inside the coil (the inner side of the ring of the coil) along the extending direction (X-direction) of the wire rope W by the flow of the exciting AC current. The excitation coil 21 applies the generated magnetic flux (magnetic field) to the wire rope W.

Specifically, an alternating current (excitation current) having a constant magnitude and a constant frequency is flowed through the excitation unit 20 (excitation coil 21) by the control of the processing unit 41. With this, the magnetic field is applied so as to oscillate in the extending direction (X-direction) of the wire rope W. That is, in the wire rope W, the magnetic field (magnetic flux) pre-aligned by the magnetic field application unit 10 oscillates such that the magnetic field in the X1-direction and the magnetic field in the X2-direction appear periodically by the excitation unit 20.

<Detection of Magnetic Flux by Detection Coil>

In the first embodiment, the detection coils 31a and 31b are arranged such that the two coils sandwich one wire rope W. Note that the detection coils 31a and 31b are provided for each of the plurality (four) wire ropes W. That is, two coils, i.e., the detection coil 31a and the detection coil 31b, are provided for each of the plurality (four) wire ropes W. Therefore, four detection coils 31a and four detection coils 31b are arranged at the first portion 30a and the second portion 30b, respectively.

As shown in FIG. 5, each of the detection coil 31a and the detection coil 31b is an independent straddle-type coil (saddle-type coil). Each of the detection coil 31a and the detection coil 31b is arranged so as to cover the half circumference of the wire rope W at the time of the inspection operation. Therefore, by combining the detection coil 31a and the detection coil 31b, the periphery of the wire rope W is surrounded over the entire circumference.

Further, the detection coils 31a and 31b are each constituted by a conductive pattern provided on a flexible substrate. Further, the detection coil 31a and 31b are provided so as to surround the wire rope W along the extending direction (X-direction) of the wire rope W. That is, the detection coils 31a and 31b are provided by the two straddle-type coils so as to wind the entire circumference of the wire rope W along the extending direction (X-direction) of the wire rope W.

Further, the first portion 30a and the second portion 30b are arranged so as to come into contact with each other at the time of the inspection operation. The first portion 30a and the second portion 30b are each provided with a groove so that the wire rope W is surrounded by the detection coil 31a and the detection coil 31b in a state in which the first portion 30a and the second portion 30b are in contact with each other.

It should be understood that in this specification, the term "wind (winding)" is used to describe the concept including not only winding over one or more turns but also winding by the number (angle) of one turn or less (for example, a half-turn).

Each of the detection coil 31a and the detection coil 31b is provided so as to wind the wire rope W along the extending direction (X-direction) of the wire rope W to detect (measure) the magnetic flux in the direction penetrating the inside of the coil along the extending direction (X-direction) of the wire rope W. The detection coils 31a and 31b are configured to detect the change in the magnetic flux (magnetic field) which is periodically changed by the excitation unit 20 (excitation coil 21).

Further, each of the detection coil 31a and the detection coil 31b outputs the magnetic flux signal (detection signal) indicating the detected magnetic flux to the magnetic flux signal acquisition unit 42 of the control board 40. For example, in the case of detecting the magnetic flux for four wire ropes W, a total of eight magnetic flux signals are acquired by the magnetic flux signal acquisition unit 42.

(Arrangement of Detection Unit at the Time of Normal Operation and Inspection Operation)

With reference to FIG. 3 and FIGS. 6 to 8, the movement of the detection unit 30 in the wire rope inspection device 101 will be described. As described above, in the wire rope inspection device 101 according to the first embodiment, at the time of the normal operation, the moving speed of the wire rope W with respect to the detection unit 30 is relatively high, and the sway width of the wire rope W due to vibration in a direction (the direction in the YZ plane) perpendicular to the traveling direction (the extending direction of the wire rope W, i.e., the X-direction) is large. At the time of the inspection operation, the moving speed of the wire rope W with respect to the detection unit 30 is relatively low, and the sway width of the wire rope W in a direction perpendicular to the traveling direction of the wire rope W is small.

The wire rope inspection device 101 according to the first embodiment is configured to change the separation distance of the detection unit 30 with respect to the wire rope W by the control by the processing unit 41 of the control board 40 at the time of the normal operation (normal operation mode) and at the time of the inspection operation (inspection operation mode).

Specifically, the wire rope inspection device 101 is configured to arrange the detection unit 30 at the normal operation position so as to relatively increase the separation distance of the detection unit 30 with respect to the wire rope W when the operation mode of the elevator 103 is set to the normal operation mode (at the time of the normal operation).

The wire rope inspection device 101 is configured to arrange the detection unit 30 at the inspection position at which the wire rope is inspected to relatively reduce the separation distance of the detection unit 30 with respect to the wire rope W when the operation mode of the elevator 103 has been switched to the inspection operation mode in which the moving speed of the wire rope W is lower than in the normal operation mode (at the time of the inspection operation). Specifically, at the time of the inspection operation, for the purpose of increasing the sensitivity of the signal generated in the detection coils 31a and 31b, the detection unit 30 (detection coils 31a and 31b) are arranged to surround the wire rope W to relatively reduce the separation distance with respect to the wire rope W.

Further, at the time of the normal operation, for the purpose of preventing the wire rope W from coming into contact with the detection unit 30 (detection coils 31a and 31b) even in a case where the sway width of the wire rope W becomes large, the detection unit 30 is arranged so as to relatively increase the separation distance of the detection unit 30 with respect to the wire rope W.

As shown in FIG. 3, the wire rope inspection device 101 is provided with a housing 101a and a base portion 101b. The magnetic field application unit 10 and the excitation unit 20 (excitation coil 21) are fixed to the housing 101a. That is, the magnetic field application unit 10 and the excitation unit 20 (excitation coil 21) are not changed in the position between at the time of the normal operation and at the time of the inspection operation.

On the other hand, the detection unit 30 (the first portion 30a and the second portion 30b) are fixed to the drive mechanism 50 (see FIG. 2) which will be described later and are configured to be able to change the position. Further, the base portion 101b is fixed to the inside of the housing 103d of the elevator 103. The housing 101a and the drive unit base portion 50a which will be described later are fixed to the base portion 101b.

<Configuration for Moving Detection Unit>

Figure 6:
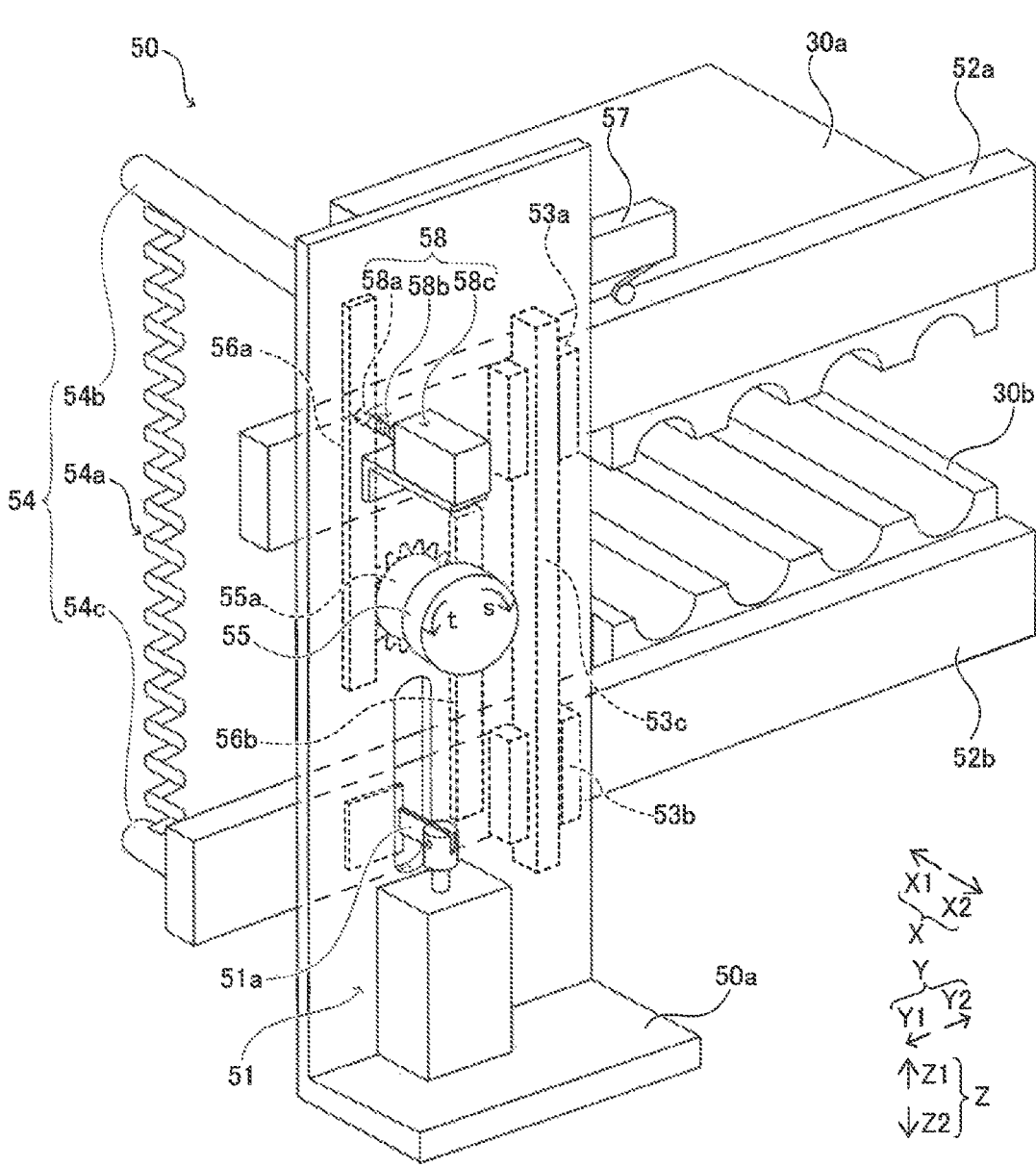
FIG. 6 is a diagram showing a configuration of a drive mechanism according to a first embodiment.

As shown in FIG. 6, the wire rope inspection device 101 is provided with a drive mechanism 50. The drive mechanism 50 includes a drive unit base portion 50a, a drive unit 51, holding plates 52a and 52b, linear guides 53a and 53b, and a linear guide rail 53c. Note that the drive unit 51 is an example of the "solenoid type drive unit" recited in claims.

The drive unit base portion 50a is attached to the base portion 101b to which the housing 101a of the wire rope inspection device 101 is fixed. The holding plates 52a and 52b hold the detection unit 30. Specifically, the holding plate 52a holds the first portion 30a at which the detection coil 31a is arranged. The holding plate 52b holds the second portion 30b at which the detection coil 31b is arranged.

Further, the linear guide 53a and the linear guide 53b are fixed to the holding plate 52a and the holding plate 52b, respectively. The linear guides 53a and 53b engage with the linear guide rail 53c fixed to the drive unit base portion 50a. By the linear guides 53a and 53b and the linear guide rail 53c, the holding plates 52a and 52b are configured to be linearly movable along the Z-direction with respect to the drive unit base portion 50a. Therefore, the first portion 30a held by the holding plate 52a and the second portion 30b held by the holding plate 52b are configured to be movable along the Z-direction.

In the first embodiment, the drive unit 51 moves the detection unit 30 (the detection coils 31a and 31b) to the normal operation position in a direction (the Z1-direction and the Z2-direction) away from the wire rope W.

Specifically, the drive unit 51 includes a solenoid type drive unit (solenoid actuator) that moves the detection unit 30 away from the wire rope W by generating a magnetic field by a current. For example, the drive unit 51 has a solenoidal coil and a movable core. The drive unit 51 moves the movable core in a direction (Z2-direction) to separate the detection unit 30 from the wire rope W by flowing a current through the solenoid coil. Further, in the drive unit 51, the solenoid coil is fixed to the drive unit base portion 50a. The movable core of the drive unit 51 is fixed to the bracket 51a. The bracket 51a is fixed to the holding plate 52b. Thus, when the drive unit 51 moves the movable core along the Z2-direction, the holding plate 52b holding the second portion 30b moves along the Z2-direction.

Further, the drive mechanism 50 includes an urging unit 54. In the first embodiment, the urging unit 54 urges the detection unit 30 (the detection coils 31a and 31b) by the elastic force to the inspection position in a direction to approach the wire rope W. In particular, the urging unit 54 is configured to urge the first portion 30a and the second portion 30b toward the inspection position by the elastic force so as to approach each other.

Specifically, the urging unit 54 includes a spring 54a and spring fixation portions 54b and 54c. The spring 54a is arranged to extend and retract along the Z-direction. Then, the Z1-direction side end portion of the spring 54a is fixed to the spring fixation portion 54b. Further, the Z2-direction side end portion of the spring 54a is fixed to the spring fixation portion 54c. The Zi-direction side end portion of the spring fixation portion 54b is fixed to the drive unit base portion 50a. The Z2-direction side end portion of the spring fixation portion 54c is fixed to the holding plate 52b. The urging unit 54 is configured such that the spring 54a in a state of being extended along the Z-direction generates an elastic force in the contraction direction to urge the holding plate 52b in the Z1-direction.

Further, the drive mechanism 50 includes, as an attenuation mechanism, a damper unit 55, a rack portion 56a, and a rack portion 56b. Note that the damper unit 55 is an example of the "attenuation unit" recited in claims.

In the first embodiment, the damper unit 55 attenuates the moving speed of the detection unit 30 when the direction unit 30 is moved in a direction to approach the wire rope W by being urged by the urging unit 54.

Specifically, the damper unit 55 attenuates the moving speed of the detection unit 30 by the viscous resistance of the fluid filled therein. Further, the damper unit 55 has a gear portion 55a. The gear portion 55a rotates while being engaged with the tooth portion of the rack portion 56a and that of the rack portion 56b, which will be described later. Further, the damper unit 55 is fixed to the drive unit base portion 50a such that the gear portion 55a is rotatable in the s-direction and the t-direction shown in FIG. 6 about the axis along the X-direction as the rotation axis.

The damper unit 55 is a rotary damper configured to attenuate the rotational speed of the gear portion 55a by the viscous resistance of the fluid in at least one direction (in a direction to approach the detection unit 30 to the wire rope W). The damper unit 55 is arranged at the central position in the Z-direction between the first portion 30a and the second portion 30b of the detection unit 30.

In the first embodiment, the rack portion 56a and the rack portion 56b each are a rod-shaped member extending linearly along the Z-direction. The rack portions 56a and 56b each have a tooth portion that engages with the gear portion 55a of the damper unit 55, respectively. That is, by the rotating gear portion 55a and the linear rack portions 56a and 56b, a rack-and-pinion structure is formed.

Specifically, the tooth portion of the rack portion 56a and that of the rack portion 56b are arranged side by side linearly along the Z-direction. In the first embodiment, the Z1-direction side one end of the rack portion 56a is fixed to the holding plate 52a, and therefore, the rack portion 56a moves in conjunction with the first portion 30a of the detection unit 30. The rack portion 56a is configured such that the Z2-direction side other end portion thereof engages with the gear portion 55a of the damper unit 55.

Further, the Z2-direction side end of the rack portion 56b is fixed to the holding plate 52b, and therefore, the rack portion 56b moves in conjunction with the second portion 30b of the detection unit 30. The rack portion 56b is configured such that the Z1-direction side other end portion thereof engages with the gear portion 55a of the damper unit 55.

The tooth portion of the rack portion 56a is arranged so as to engage with the gear portion 55a on the Y1-direction side of the gear portion 55a which rotates about the axis along the X-direction as a rotation axis. The tooth portion of the rack portion 56b is arranged so as to engage with the gear portion 55a on the Y2-direction side of the gear portion 55a which rotates about the axis along the X-direction as a rotation axis.

Thus, when the gear portion 55a is rotated in the s-direction in FIG. 6, the rack portion 56a and the rack portion 56b move in a direction away from each other in the Z-direction in conjunction with the rotational movement of the gear portion 55a. Further, when the gear portion 55a is rotated in the t-direction in FIG. 6, the rack portion 56a and the rack portion 56b are moved in a direction to approach each other in the Z-direction in conjunction with the rotational movement of the gear portion 55a. Therefore, in the drive mechanism 50 according to the first embodiment, the two rack portions 56a and 56b are moved in conjunction with the rotational movement of one gear portion 55a, and therefore, the first portion 30a and the second portion 30b are configured to move by an equal distance in conjunction with each other.

Further, in the damper unit 55, the rotational speed of the gear portion 55a in at least the t-direction (the direction to approach the rack portion 56a and the rack portion 56b each other) is attenuated. Therefore, the first portion 30a and the second portion 30b are configured such that the moving speed is attenuated in conjunction with each other.

Further, the drive mechanism 50 of the wire rope inspection device 101 includes a position detection unit 57 and a fixing unit 58. In the first embodiment, the detection unit 30 is fixed at the normal operation position at the time of the normal operation.

In the first embodiment, the position detection unit 57 detects that the detection unit 30 has been arranged at the normal operation position. Specifically, the position detection unit 57 has been fixed to the drive unit base portion 50a. The position detection unit 57 includes a mechanical switch that is switched on by abutting the holding plate 52a when the first portion 30a is moved in the Z1-direction and arranged at the normal operation position. Further, when the switch is turned on, the position detection unit 57 outputs a position detection signal indicating that it has detected the first portion 30a to the control board 40.

The fixing unit 58 fixes the first portion 30a of the detection unit 30 in a state in which the first portion 30a is arranged at the normal operation position. Specifically, the fixing unit 58 includes a fixing pin 58a, a spring 58b, and an actuator 58c. The fixing unit 58 is fixed to the drive unit base portion 50a. The fixing unit 58 fixes the first portion 30a held by the rack portion 56a by engaging (inserting) the fixing pin 58a in the hole portion 56c (see FIG. 8) provided in the rack portion 56a.

Further, the fixing pin 58a is urged by the spring 58b in a direction (X1-direction) to be inserted into the hole portion 56c.

The actuator 58c applies a force to the fixing pin 58a to move the fixing pin 58a in a direction (X2-direction) to pull out of the hole portion 56c. Specifically, the actuator 58c is a solenoid actuator having a solenoid-coil and a movable core. The actuator 58c pulls out the fixing pin 58a from the hole portion 56c based on the control signal from the control board 40 to release the fixing of the detection unit 30 by the fixing unit 58.

Therefore, the fixing unit 58 is configured to move the fixing pin 58a toward the first portion 30a of the detection unit 30 by the urging force of the spring 58b when the driving force by the actuator 58c is not being generated. That is, even when the drive signal (driving power) from the control board 40 is not being generated, the fixing unit 58 continuously fixes the detection unit 30 (the first portion 30a) at the normal operation position in a state of inserting the fixing pin 58a into the hole portion 56c.

In a state in which the detection unit 30 (first portion 30a) is arranged at the inspection position, the rack portion 56a is configured to extend to the position above (on the Z1-direction side) the fixing pin 58a in the Z-direction. Therefore, the drive mechanism 50 of the wire rope inspection device 101 is configured such that the fixing pin 58a does not protrude beyond the rack portion 56a in the X1-direction, even in a case where the driving force of the actuator 58c of the fixing unit 58 is stopped in a state in which the detection unit 30 is arranged at the inspection position.

By configuring as described above, the drive mechanism 50 of the wire rope inspection device 101 is configured such that the rack portion 56a (the first portion 30a) is prevented from being moved in the Z1-direction by the fixing pin 58a projected on the X1-direction side when moving the detection unit 30 from the inspection position to the normal operation position.

<Movement of Detection Unit to Normal Operation Position>

As shown in FIGS. 7 and 8, when the operation of the elevator 103 is switched from the inspection operation mode to the normal operation mode in accordance with the input operation to the processing device 102, each part of the drive mechanism 50 is controlled by the processing unit 41 of the control board 40 such that the detection unit 30 moves from the inspection position to the normal operation position.

Note that in FIGS. 7 and 8, the portion illustrated as being connected to the ground indicates that it is fixed to the drive unit base portion 50*a*.

Specifically, when the driving power is supplied from the control board 40 to the drive unit 51, the drive unit 51 moves the holding plate 52*b* in the Z2-direction so that the second portion 30*b* of the detection unit 30 is moved toward the Z2-direction side. At this time, the holding plate 52*a* and the holding plate 52*b* are moved in conjunction with each other by the damper unit 55 (gear portion 55*a*), the rack portion 56*a*, and the rack portion 56*b*, and therefore, the first portion 30*a* is moved toward the Z1-direction side by the driving force of the drive unit 51. That is, the drive unit 51 moves the first portion 30*a* and the second portion 30*b* so as to be spaced by an equal distance from the wire rope W while resisting the elastic force by the urging unit 54.

Then, when the first portion 30*a* moved in the Z1-direction has reached the normal operation position, it is detected by the position detection unit 57 that the first portion 30*a* has been arranged at the normal operation position. The first portion 30*a* is fixed by the fixing unit 58. For example, the control board 40 (processing unit 41) has stopped supplying the driving force to the actuator 58*c* of the fixing unit 58 when the detection unit 30 is arranged at the inspection position.

In that case, the fixing pin 58*a* of the fixing unit 58 is stopped in a state in which it is in contact with the surface of the rack portion 56*a* on the X2-direction side while being urged in the X1-direction by the spring 58*b*. Then, when the rack portion 56*a* is moved by the drive unit 51 and therefore, the first portion 30*a* has moved to the normal operation position, the fixing pin 58*a* is inserted into the hole portion 56*c* by the spring 58*b* of the fixing unit 58, thereby fixing the first portion 30*a*.

Further, by the rack portions 56*a* and 56*b* and the gear portion 55*a*, the first portion 30*a* and the second portion 30*b* are configured to be operated in conjunction with each other. Therefore, when the position of the first portion 30*a* is fixed, the position of the second portion 30*b* is also fixed.

As described above, when the operation of the elevator 103 is switched from the inspection operation mode to the normal operation mode, the detection unit 30 (the first portion 30*a* and the second portion 30*b*) is moved to the normal operation position while resisting the elastic force of the urging unit 54 by the driving force of the drive unit 51. Then, the detection unit 30 arranged at the normal operation position is fixed by the fixing unit 58.

Note that it may be configured such that when moving the detection unit 30 (the first portion 30*a* and the second portion 30*b*) from the inspection position to the normal operation position, the fixing pin 58*a* may be moved on the X2-direction side by supplying the driving force to the actuator 58*c* of the fixing unit 58. In this case, the drive mechanism 50 may be configured to insert the fixing pin 58*a* into the hole portion 56*c* of the rack portion 56*a* by stopping the supply of the driving force to the actuator 58*c*, based on the position detection signal by the position detection unit 57.

<Movement of Detection Unit to Inspection Position>

Further, when the operation of the elevator 103 is switched from the normal operation mode to the inspection operation mode based on the input operation to the processing device 102, each part of the drive mechanism 50 is controlled by the processing unit 41 of the control board 40 such that the detection unit 30 is moved from the normal operation position to the inspection position.

Specifically, first, the fixing of the detection unit 30 (the first portion 30*a* and the second portion 30*b*) fixed by the fixing unit 58 at the normal operation position is released. That is, the driving power is supplied to the actuator 58*c* of the fixing unit 58, so that the fixing pin 58*a* is pulled out from the hole portion 56*c* of the rack portion 56*a*. As a result, the fixing of the first portion 30*a* is released, so that the first portion 30*a* and the second portion 30*b* are urged to approach with each other by the elastic force of the spring 54*a* of the urging unit 54.

At this time, in the first portion 30*a* and the second portion 30*b*, the moving speed is attenuated by the damper unit 55. Further, in the first portion 30*a* and the second portion 30*b*, the rack portion 56*a* and the rack portion 56*b* are engaged with the gear portion 55*a* of the damper unit 55, and therefore, the first portion 30*a* and the second portion 30*b* move at the moving speed equal to each other. Further, the first portion 30*a* and the second portion 30*b* are equally spaced from the wire rope W.

For this reason, the first portion 30*a* and the second portion 30*b* move at the same speed in the direction to approach the wire rope W by being urged by the elastic force of the urging unit 54. As a result, the first portion 30*a* and the second portion 30*b* stop the movement at the position of the wire rope W in a state of being in contact with each other.

As described above, when the operation of the elevator 103 is switched from the normal operation mode to the inspection operation mode, the detection unit 30 (the first portion 30*a* and the second portion 30*b*) is moved to the inspection position by the elastic force of the urging unit 54 while the moving speed of the detection unit 30 is being attenuated by the damper unit 55. In the first embodiment, the first portion 30*a* and the second portion 30*b* are configured to be arranged at the inspection position in a state in which the first portion 30*a* and the second portion 30*b* are positioned in a state of being in contact with each other by being urged by the urging unit 54.

(Effects of First Embodiment)

In the wire rope inspection device 101 according to the first embodiment, the following effects can be obtained.

In the wire rope inspection device 101 according to the first embodiment, as described above, the urging unit 54 is provided. The urging unit 54 is configured to urge the detection unit 30 in a direction to approach the wire rope W to the inspection position at which the detection unit 30 is arranged at the time of the inspection operation for inspecting the detection unit 30.

With this, the detection unit 30 can be moved to the inspection position at which the inspection is performed by being urged by the urging unit 54. Therefore, without controlling the movement of the detection unit 30, it is possible to arrange the detection unit 30 to approach the wire rope W as close as possible by urging by the elastic force of the urging unit 54. Therefore, it is possible to arrange the detection unit 30 as close as possible to the wire rope W without finely controlling the movement of the detection unit 30. As a result, it is possible to suppress an increase in the processing load of the control processing.

Therefore, in the case of remotely moving the detection unit 30 for detecting the magnetic flux in the wire rope W, the detection unit 30 can be easily arranged to approach the wire rope W as close as possible. Further, at the time of the normal operation, there is no need to finely control the arrangement of the detection unit 30. Therefore, it is possible to easily arrange the detection unit 30 at the normal operation position by moving the detection unit 30 by the drive unit 51 against the elastic force (urging force) of the urging unit 54 in a direction away from the wire rope W to the normal operation position at which the detection unit 30 is arranged at the time of the normal operation.

Further, in the first embodiment, further effects can be obtained by the following configuration.

That is, in the first embodiment, the detection unit 30 includes the first portion 30a arranged on one side (Z1-direction side) in a direction perpendicular to the extending direction of the wire rope W and the second portion 30b arranged on the other side (Z2-direction side). The urging unit 54 is configured to urge the first portion 30a and the second portion 30b to approach each other to the inspection position by the elastic force.

By configuring as described above, the first portion 30a and the second portion 30b of the detection unit 30 are urged to approach each other by the urging unit 54. Therefore, it is possible to easily cause the first portion 30a and the second portion 30b to approach the wire rope W from both sides of the wire rope W. Therefore, the detection unit 30, which is divided into the first portion 30a and the second portion 30b, can be easily arranged such that the detection unit 30 approaches the wire rope W as close as possible to surround the wire rope W.

Further, in the first embodiment, the drive unit 51 is configured to move the first portion 30a and the second portion 30b to be spaced by an equal distance from the wire rope W.

By configuring as described above, by moving the first portion 30a and the second portion 30b by the drive unit 51, it is possible to arrange the first portion 30a and the second portion 30b at positions spaced by an equal distance from the wire rope W. Therefore, when moving the first portion 30a and the second portion 30b in a direction to approach the wire rope W by urging the first portion 30a and the second portion 30b by the elastic force of the urging unit 54, it is possible to arrange the wire rope W at the intermediate position between the first portion 30a and the second portion 30b.

Therefore, the distance between each of the first portion 30a and the second portion 30b and the wire rope W can be made equal. Therefore, when the first portion 30a and the second portion 30b are arranged to surround the wire rope W, the detection result by the first portion 30a and the second portion 30b can be acquired with high accuracy.

Further, in the first embodiment, the first portion 30a and the second portion 30b are configured to be arranged at the inspection position in a state in which the first portion 30a and the second portion 30b are positioned in a state of being in contact with each other by being urged by the urging unit 54.

By configuring as described above, the first portion 30a and the second portion 30b are positioned in a state in which they are in contact with each other by being urged by the urging unit 54. Therefore, the elastic force of the urging unit 54 allows the first portion 30a and the second portion 30b to be positioned around the wire rope W in a state of being urged in a direction to be brought into close contact with each other by the urging force of the urging unit 54.

As a result, the first portion 30a and the second portion 30b are brought into close contact with each other, which can prevent the positional displacement of the first portion 30a and the second portion 30b. Therefore, the detection result by the detection unit 30 can be acquired with high precision.

Further, in the first embodiment, the fixing unit 58 for fixing the detection unit 30 in a state of being arranged at the normal operation position is provided.

By configuring as described above, the detection unit 30 can be fixed by the fixing unit 58 at the normal operation position. Therefore, without generating a driving force in the drive unit 51 so as to resist the elastic force of the urging unit 54, it is possible to fix the detection unit 30 at the normal operation position. Therefore, it is possible to fix the detection unit 30 at the normal operation position by the fixing unit 58 without continuously supplying power to the drive unit 51 at the time of the normal operation. Therefore, it is possible to suppress the increase in the power consumption at the time of the normal operation.

Further, in the first embodiment, the damper unit 55 (attenuation unit) is provided. The damper unit 55 is configured to attenuate the moving speed of the detection unit 30 when the detection unit 30 is moved in a direction to approach the wire rope W by being urged by the urging unit 54.

By configuring as described above, it is possible to attenuate the moving speed of the detection unit 30 which is moved by being urged by the elastic force of the urging unit 54. Therefore, it is possible to suppress the moving speed when the detection unit 30 is moved toward the inspection position from becoming higher than required. Therefore, it is possible to suppress a large force from being applied to the detection unit 30 when the detection unit 30 is arranged at the inspection position, and therefore, it is possible to suppress the occurrence of abnormalities in the detection unit 30.

Further, in the first embodiment, the drive unit 51 includes a solenoid type drive unit for moving the detection unit 30 in a direction away from the wire rope W by generating a magnetic field by a current. The damper unit 55 (attenuation unit) attenuates the moving speed of the detection unit 30 by the viscous resistivity of the fluid filled therein when the detection unit 30 is moved in a direction to approach the wire rope W by being urged by the urging unit 54.

By configuring as described above, it is possible to attenuate the moving speed of the detection unit 30 by the damper unit 55 when the detection unit 30 is moved in a direction to approach the wire rope W. Therefore, when moving the detection unit 30 toward the inspection position in a direction to approach the wire rope W, without using the driving force of the drive unit 51, it is possible to move the detection unit 30 while suppressing the moving speed from becoming too high. Therefore, without controlling the magnitude of the driving force of the drive unit 51, it is possible to easily suppress the moving speed of the detection unit 30 when moving in a direction to approach the wire rope W from becoming too high.

Further, in the first embodiment, the rack portions 56a and 56b each having a tooth portion and each extending linearly are provided.

The damper unit 55 has a gear portion 55a which rotates while engaged with the tooth portions of the rack portions 56a and 56b and is configured to attenuate the rotational speed of the gear portion 55a. The rack portion 56a and 56b are each configured such that the one end thereof is fixed to the detection unit 30 and the other end thereof is engaged with the gear portion 55a of the damper unit 55.

By configuring as described above, the rotational speed of the gear portion 55a of the damper unit 55 is attenuated, which in turn can attenuate the moving speed of the rack portions 56a and 56b engaged with the gear portion 55a. Therefore, the moving speed of the detection unit 30 which is fixed to one end of the rack portion 56a and 56b can be easily attenuated by the damper unit 55.

Further, in the same manner as in the first embodiment, by configuring to arrange the two rack portions 56a and 56b to face each other with respect to one gear portion 55a of the damper unit 55, the rotational of one gear portion 55a of the damper unit 55 can cause the two rack portions 56a and 56b to move by the same distance while attenuating the moving speed.

Therefore, in a case where two different detection units 30 (the first portion 30a and the second portion 30b) are arranged on both sides of the damper unit 55, it is possible to equalize the moving distance of the two different detection units 30 and attenuate the moving speed of the two different detection units 30. Therefore, in a case where the two different detection units 30 are provided, as compared with the case in which the moving speeds of the two different detection units 30 are attenuated, respectively, by separate attenuation units, it is possible to attenuate the moving speeds of the two different detection unit 30 by a common one attenuation unit (the damper unit 55), which can suppress the complication of the device configuration.

Further, in the first embodiment, the position detection unit 57 for detecting that the detection unit 30 is arranged at the normal operation position is provided. By configuring as described above, it is possible to easily detect by the position detection unit 57 that the detection unit 30 has been arranged at the normal operation position. Therefore, it is possible, for example, to easily perform the control for fixing the detection unit 30 at the normal operation position or the control for starting the normal operation upon completion of the inspection, based on the position detection signal by the position detection unit 57.

Further, in the first embodiment, the detection unit 30 is configured to detect the magnetic flux in the moving wire rope W in a state in which the wire rope W provided on the elevator 103 is moving along the extending direction (X-direction) of the wire rope W by the driving of the elevator 103.

The urging unit 54 is configured to urge the detection unit 30 to the inspection position at which the detection unit 30 is arranged at the time of the inspection operation of the elevator 103 which is relatively low in the moving speed of the wire rope W with respect to the detection unit 30.

The drive unit 51 is configured to move the detection unit 30 to the normal operation position at which the detection unit 30 is arranged at the time of the normal operation of the elevator 103 which is relatively high in the moving speed of the wire rope W with respect to the detection unit 30.

Here, when inspecting the wire rope W provided to the elevator 103, the sway width of the wire rope W in a direction perpendicular to the extending direction (traveling direction) of the wire rope W becomes small at the time of the inspection operation at which the moving speed of the wire rope W is relatively low. On the other hand, at the time of the normal operation in which the moving speed of the wire rope W is relatively high, the sway width of the wire rope W in a direction perpendicular to the extending direction of the wire rope W becomes large.

In contrast, in the first embodiment, the urging unit 54 is configured to urge the detection unit 30 to the inspection position at which the detection unit 30 is arranged at the time of the inspection of the elevator 103 in which the moving speed of the wire rope W is relatively low. The drive unit 51 is configured to move the detection unit 30 to the normal operation position at which the detection unit 30 is arranged at the time of the normal operation in which the moving speed of the wire rope W with respect to the detection unit 30 is relatively high.

By configuring as described above, when inspecting the wire rope W of the elevator 103, it is possible to urge the detection unit 30 to approach the wire rope W as close as possible by the urging unit 54 at the time of the inspection operation in which the sway width of the wire rope W is relatively small. Further, it is possible to move the detection unit 30 so as to be arranged at the position away from the wire rope W by the drive unit 51 at the time of the normal operation in which the sway width of the wire rope W is relatively large.

Therefore, by using the urging unit 54 and the drive unit 51, it is possible to arrange the detection unit 30 so as to further improve the detection sensitivity at the time of the inspection operation. Further, at the time of the normal operation, it is possible to move the detection unit 30 by remote control to arrange the detection unit 30 so as to avoid the contact between the wire rope W and the detection unit 30.

As a result, even in the case of remotely moving the detection unit 30 with respect to the wire rope W of the elevator 103, by using the urging unit 54 and the drive unit 51, it is possible to easily arrange the detection unit 30 to approach the wire rope W as close as possible at the time of the inspection operation. Further, at the time of the normal operation, it is possible to easily arrange the detection unit 30 at a position away from the wire rope W.

Further, in the first embodiment, the magnetic field application unit 10 is provided. The magnetic field application unit 10 is configured to align the direction of magnetization of the wire rope W by applying a magnetic field in advance with respect to the wire rope W. The excitation unit 20 includes the excitation coil 21 for exciting the magnetization state of the wire rope W after a magnetic field is applied in advance by the magnetic field application unit 10. The detection unit 30 includes the detection coils 31a and 31b which are wound around the wire rope W along the extending direction of the wire rope W to detect the magnetic flux in the wire rope W in which the state of magnetization is excited by the excitation coil 21, by a total magnetic flux method. The urging unit 54 is configured to urge the detection coils 31a and 31b to the inspection position by an elastic force. The drive unit 51 is configured to move the detection coils 31a and 31b to the normal operation position.

By configuring as described above, even in the case of inspecting the wire rope W by a total magnetic flux method, it is possible to move the detection coils 31a and 31b for detecting the magnetic flux in the wire rope W so as to wind around the wire rope W by remote control by using the urging unit 54 and the drive unit 51. Consequently, even in the case of inspecting the wire rope W by a total magnetic flux method, it is possible to easily arrange the detection unit 30 to approach as close as possible to the wire rope W.

Second Embodiment

With reference to FIGS. 9 to 13, the configuration of a wire rope inspection device 201 according to a second embodiment will be described. In this second embodiment, different from the first embodiment configured to move the detection unit 30 to be spaced from the wire rope W by the solenoid type drive unit, it is configured to move the detection unit 30 so as to be spaced from the wire rope W by a motor 251.

Note that in the drawings, the same component as that of the above-described first embodiment is denoted by the same reference numeral, and the description thereof will be omitted.

(Configuration of Wire Rope Inspection System of Second Embodiment)

Figure 9:
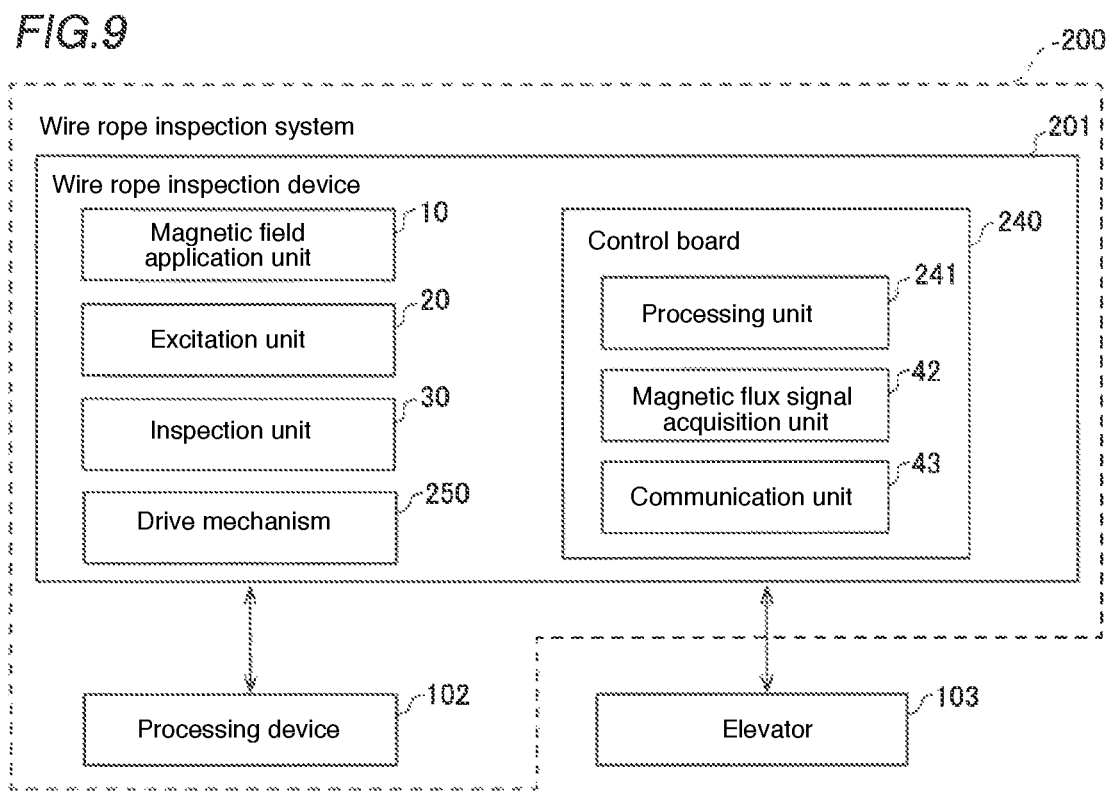
FIG. 9 is a block diagram showing an entire configuration of a wire rope inspection system according to a second embodiment.
Figure 10:
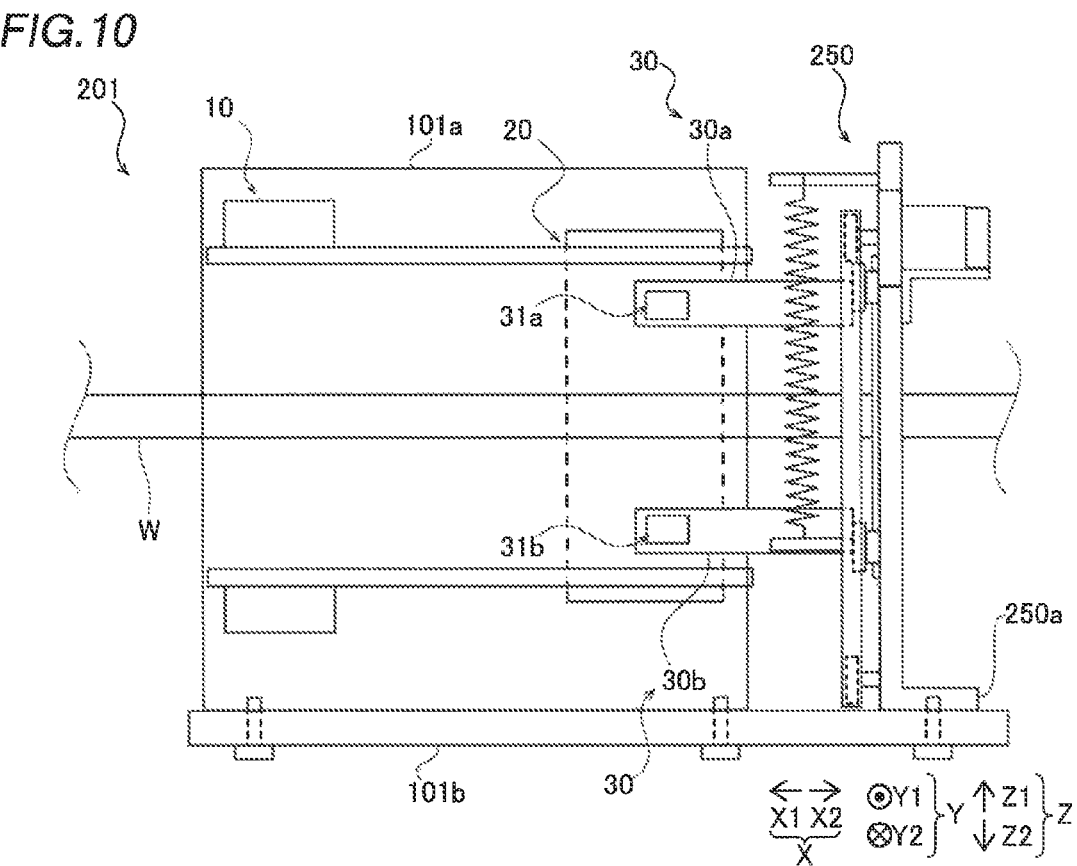
FIG. 10 is a diagram showing a configuration of a wire rope inspection device according to a second embodiment.

As shown in FIGS. 9 and 10, the wire rope inspection system 200 according to the second embodiment is provided with a wire rope inspection device 201. The wire rope inspection device 201 is provided with a control board 240 and a drive mechanism 250.

Note that the configuration (the magnetic field application unit 10, the excitation unit 20, and the detection unit 30) for measuring the magnetic flux (magnetic field) in the wire rope W according to the second embodiment is the same as that of the first embodiment.

The control board 240 includes a processing unit 241, a magnetic flux signal acquisition unit 42, and a communication unit 43. Similar to the control board 40 of the first embodiment, the control board 240 controls the operation of the excitation unit 20 (excitation coil 21) based on the control signal from the processing unit 241. Further, like the first embodiment, the control board 240 performs control of each part of the wire rope inspection device 201 by the control processing by the processing unit 241.

The processing unit 241 of the control board 240 according to the second embodiment is configured to execute the speed control of the motor 251 which will be described later. The other configurations of the control board 240 are similar to those of the control board 40 of the first embodiment. Further, the details of the speed control of motor 251 will be described later.

(Movement of Detection Unit by Second Embodiment)

Figures 11, 12:
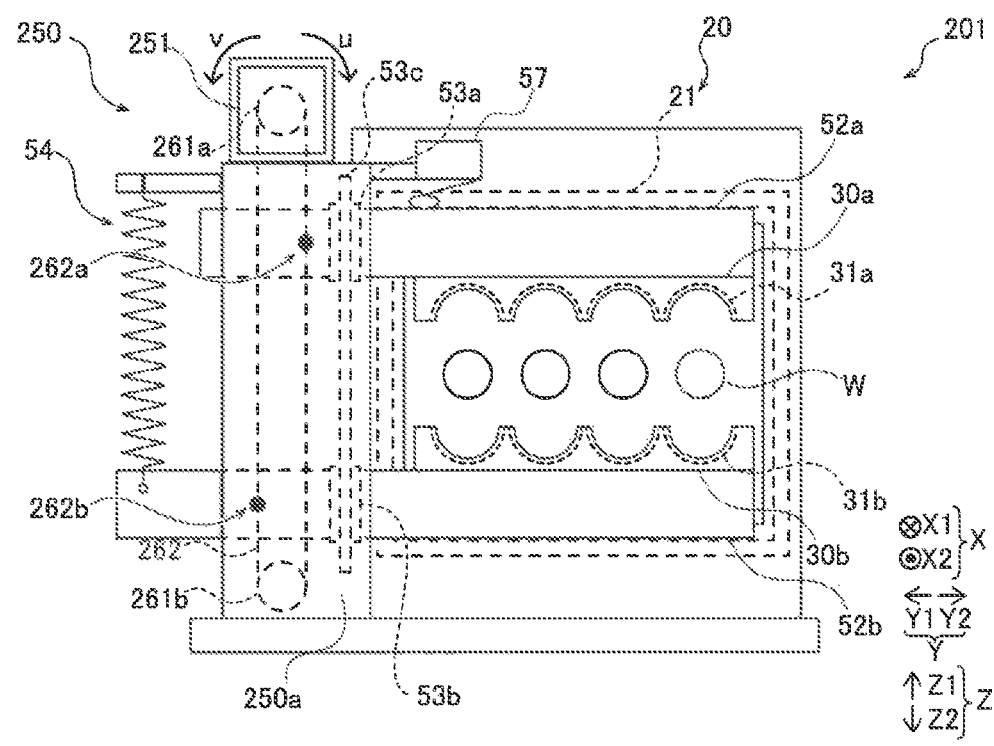
FIG. 11 is a diagram showing the arrangement of a detection unit and a drive mechanism at the time of a normal operation by a wire rope inspection device according to a second embodiment.
FIG. 12 is a diagram showing the arrangement of a detection unit and a drive mechanism at the time of an inspection operation by a wire rope inspection device according to a second embodiment.

As shown in FIGS. 11 and 12, the drive mechanism 250 includes a drive unit base portion 250a. In the same manner as in the drive unit base portion 50a of the first embodiment, the drive unit base portion 250a is attached to the base portion 101b (see FIG. 10) to which the housing 101a of the wire rope inspection device 201 is fixed.

Note that the drive mechanism 250 includes an urging unit 54. The urging unit 54 is configured to urge the first portion 30a and the second portion 30b to approach each other to the inspection position by the elastic force, in the same manner as in the first embodiment.

Further, the drive mechanism 250 includes a motor 251. The motor 251 is fixed to the drive unit base portion 250a. The motor 251 has a rotation shaft 251a (see FIG. 13). The motor 251 rotates the rotation shaft 251a in the u-direction and the v-direction under the control of the processing unit 241 of the control board 240. Further, the motor 251 is configured to be velocity-controllable.

Specifically, the control board 240 includes a motor driver (not shown). The motor 251 is, for example, a stepping motor that rotates the rotation shaft 251a by driving power from a motor driver. The motor driver outputs the drive power for driving the motor 251 based on the control by the processing unit 241. Further, the processing unit 241 is configured to execute the control for changing the rotational speed of the motor 251 by controlling the operation of the motor driver. Note that the motor 251 is an example of the "drive unit" and the "attenuation unit" recited in claims.

Further, the drive mechanism 250 includes toothed pulleys 261a and 261b and a belt 262. The toothed pulley 261a is connected to the rotation shaft 251a of the motor 251 via a one-way clutch 263 (see FIG. 13) which will be described later. The belt 262 transmits the rotation of the toothed pulley 261a to the toothed pulley 261b. The toothed pulley 261b is rotatably attached to the drive unit base portion 250a. The belt 262 has fixing points 262a and 262b. The fixing point 262a is fixed to the holding plate 52a. The fixing point 262b is fixed to the holding plate 52b.

In the drive mechanism 250 according to the second embodiment, when the toothed pulley 261a rotates in the u-direction, the fixing point 262a of the belt 262 moves in the Z2-direction, and the fixing point 262b moves in the Z1-direction. As a result, the first portion 30a and the second portion 30b move in a direction to approach each other. When the toothed pulley 261a rotates in the v-direction, the fixing point 262a of the belt 262 moves in the Z1-direction, and the fixing point 262b moves in the Z2-direction. As a result, the first portion 30a and the second portion 30b move in directions away from each other in conjunction with each other.

Figure 13:
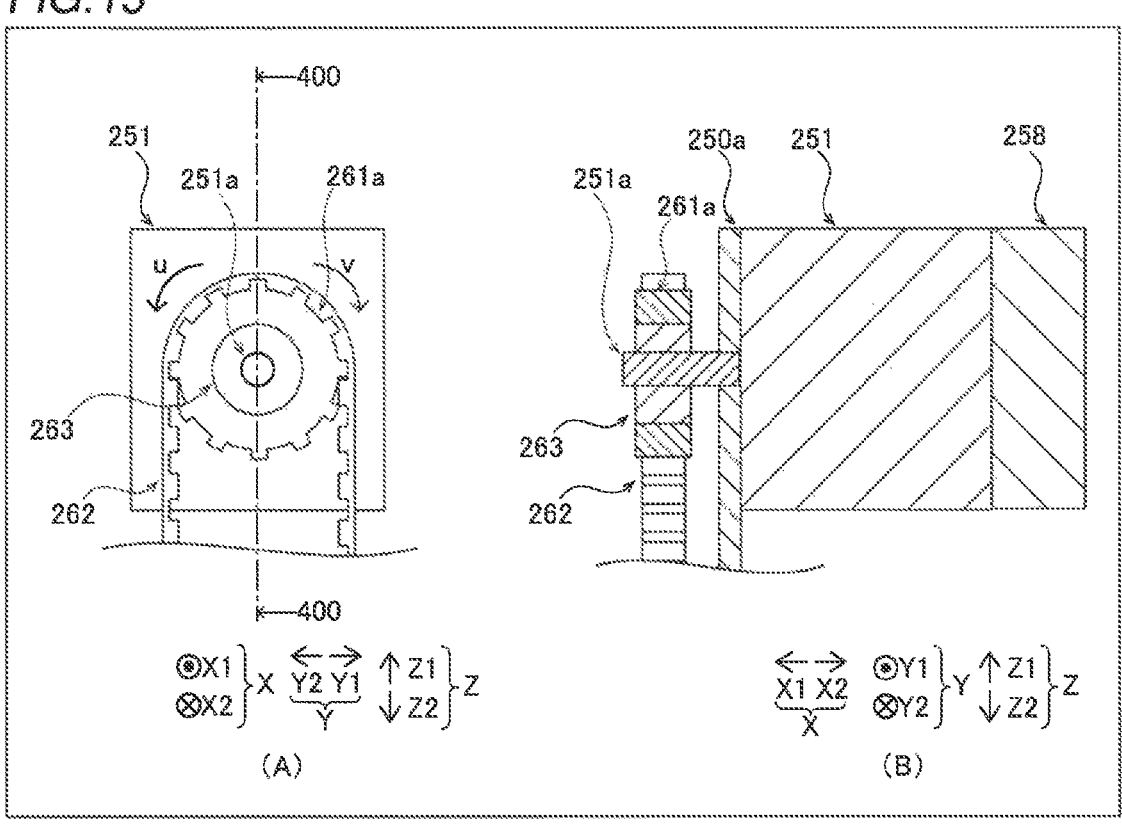
In FIG. 13, (A) shows a diagram for explaining a one-way clutch according to a second embodiment, which is viewed from the X1-direction side.

Here, as shown in FIG. 13, the drive mechanism 250 includes a one-way clutch 263. In the second embodiment, the one-way clutch 263 is connected to the rotation shaft 251a of the motor 251. Further, the one-way clutch 263 has a clutching mechanism that transmits a rotational force in only one rotational direction.

Specifically, the one-way clutch 263 rotates synchronously with the rotation shaft 251a when the rotation shaft 251a of the motor 251 applies a rotational force in the v-direction. When the rotation shaft 251a of the motor 251 applies a rotational force in the u-direction, the one-way clutch 263 idles with respect to the rotation shaft 251a.

Further, the drive mechanism 250 includes a brake 258. The brake 258 is configured to suppress the rotation of the rotation shaft 251a of the motor 251 (fix the rotation shaft 251a) based on the control signal from the processing unit 241 of the control board 240. The processing unit 241 of the control board 240 fixes the rotation shaft 251a of the motor 251 by the brake 258 based on the position detection signal from the position detection unit 57. When the brake 258 fixes the rotation shaft 251a of the motor 251, the first portion 30a and the second portion 30b of the detection unit 30 are fixed in a state of being fixed at the normal operation position.

Note that the brake 258 is an example of the "fixing unit" recited in claims. At this time, it is preferable that the brake 258 is operated when the brake (fixing) of the rotation shaft 251a is released and the energization (supplying of electric power) is cut off at the time of energization in which electric power is supplied from the control board 240.

<Movement of Detection Unit to Normal Operation Position>

As shown in FIGS. 11 and 12, in the same manner as in the first embodiment, each part of the drive mechanism 250 is controlled by the processing unit 241 of the control board 240. That is, when the operation of the elevator 103 is switched from the inspection operation mode to the normal operation mode based on the input operation to the processing device 102, each part of the drive mechanism 250 is controlled by the processing unit 241 of the control board 240 such that the detection unit 30 moves from the inspection position to the normal operation position.

In the second embodiment, the motor 251 moves the detection unit 30 (the detection coils 31a and 31b) in the directions (the Z1-direction and the Z2-direction) away from the wire rope W.

Specifically, the motor 251 rotates in one rotational direction (the v-direction in FIG. 11) against the elastic force by the urging unit 54 by the control of the processing unit 241 of the control board 240. Here, the motor 251 applies a rotational force to rotate the rotation shaft 251a in the v-direction against the elastic force by the urging unit 54. For this reason, the one-way clutch 263 rotates in synchronization with the rotation shaft 251a. With this, when the motor 251 rotates in the v-direction to move the first portion 30*a* and the second portion 30*b* in the directions away from each other, the toothed pulley 261*a* rotates in synchronization with the rotation shaft 251*a* of the motor 251.

When the motor 251 rotates in the v-direction, the toothed pulley 261*a* rotates synchronously with the rotation shaft 251*a* of the motor 251, and therefore, the first portion 30*a* and the second portion 30*b* move in the Z1-direction and the Z2-direction, respectively. Thus, the motor 251 moves the detection coils 31*a* and 31*b* (the first portion 30*a* and the second portion 30*b*) in the directions away from the wire rope W by rotating in the v-direction.

In the second embodiment, the one-way clutch 263 is configured to rotate together with the rotation shaft 251*a* of the motor 251 when the motor 251 is applying the driving force to the detection unit 30 in a direction away from the wire rope W.

When the first portion 30*a* moved in the Z1-direction has reached the normal operation position, it is detected by the position detection unit 57 that the first portion 30*a* has been arranged at the normal operation position. In this case, the brake 258 restrains the rotation shaft 251*a* of the motor 251 from rotating (the rotation shaft 251*a* is fixed), thereby restraining the first portion 30*a* and the second portion 30*b* from moving. The detection unit 30 (the first portion 30*a* and the second portion 30*b*) is fixed to the normal operation position.

<Movement of Detection Unit to Inspection Position>

Further, in the same manner as in the first embodiment, when the operation of the elevator 103 is switched from the normal operation mode to the inspection operation mode on the basis of the input operation to the processing device 102, each part of the drive mechanism 250 is controlled by the processing unit 241 of the control board 240 such that detection unit 30 moves from the normal operation position to the inspection position.

Specifically, first, the fixing of the rotation shaft 251*a* of the motor 251 by the brake 258 is released. Since the fixing of the rotation shaft 251*a* is released, the first portion 30*a* and the second portion 30*b* are urged to approach each other by the elastic force of the urging unit 54.

Here, in the second embodiment, the motor 251 is configured to attenuate the moving speed of the detection unit 30 by rotating while limiting the speed in the other rotation direction (u-direction) opposite to the one rotation direction (v-direction) when the detection unit 30 moves in a direction to approach the wire rope W by being urged by the urging unit 54. Specifically, the motor 251 rotates at a constant rate in the u-direction while resisting the elastic force of the urging unit 54 so as to attenuate the moving speed when the first portion 30*a* and the second portion 30*b* are moved to approach each other.

In this case, the belt 262 applies the rotational force in the u-direction to the toothed pulley 261*a* by the elastic force by the urging unit 54. The motor 251 rotates the rotation shaft 251*a* in the u-direction at a constant rate while applying a force to support it in the v-direction against the elastic force by the urging unit 54. At this time, the one-way clutch 263 rotates synchronously with the rotation shaft 251*a* of the motor 251 because the rotation shaft 251*a* applies the force in the v-direction.

The first portion 30*a* and the second portion 30*b* comes into contact with each other by being arranged at the inspection position. At this timing, since the first portion 30*a* and the second portion 30*b* stop moving by coming into contact with each other, the driving force (rotational force) of the motor 251 is attempted to apply a force toward the u-direction. Therefore, since the one-way clutch 263 idles with respect to rotation shaft 251*a*, the driving force of motor 251 is not transmitted to the toothed pulley 261*a*.

That is, in the second embodiment, the one-way clutch 263 is configured to idle with respect to the rotation shaft 251*a* of the motor 251 when the motor 251 is applying the driving force to the detection unit 30 in a direction to approach the wire rope W. Therefore, the first portion 30*a* and the second portion 30*b* arranged in contact with each other is held (fixed) at the inspection position only by the elastic force of the urging unit 54 in a state in which the driving force of the motor 251 is not applied even when the motor 251 is rotating continuously.

Note that other configurations of the second embodiment are the same as those of the first embodiment.

(Effects of Second Embodiment)

In the second embodiment, the following effects can be obtained.

In the second embodiment, the motor 251 (the drive unit, the attenuation unit) moves the detection unit 30 in a direction away from the wire rope W by rotating in one rotational direction (in the v-direction). Further, the motor 251 is configured to be speed-controllable and rotate while limiting the speed in the other rotation direction (the u-direction) opposite to the one rotation direction (the v-direction) when the detection unit 30 is moved in a direction to approach the wire rope W by being urged by the urging unit 54.

With this, the moving speed of the detection unit 30 is attenuated. By configuring as described above, the speed-controllable motor 251 makes it possible to perform both of the movement of the detection unit 30 to the normal operation position and the attenuation of the moving speed when moving the detection unit 30 to the inspection position. Therefore, unlike the case in which the configuration for attenuating the moving speed is provided separately from the motor 251, it is possible to simplify the device configuration.

Further, in the wire rope inspection device 201 according to the second embodiment, the following effects can be further obtained by the following configuration.

That is, in the second embodiment, the one-way clutch 263 connected to the rotation shaft 251*a* of the motor 251 is provided. The one-way clutch 263 rotates together with the rotation shaft 251*a* of the motor 251 when the motor 251 is applying the driving force to the detection unit 30 in a direction away from the wire rope W. The one-way clutch 263 is configured to idle with respect to the rotation shaft 251*a* of the motor 251 when the motor 251 is applying the driving force to the detection unit 30 in a direction for the detection unit 30 to approach the wire rope W.

By configuring as described above, when the motor 251 is attempting to apply the driving force to the detection unit 30 in a direction for the detection unit 30 to approach the wire rope W, the one-way clutch 263 idles. Therefore, it is possible to suppress the motor 251 from applying the force in a direction to approach the wire rope W. Therefore, a force is applied to the detection unit 30 in a direction for the detection unit 30 to approach the wire rope W only by the elastic force of the urging unit 54.

Therefore, it is possible to suppress that the force other than the elastic force of urging unit 54 acts on the detection unit 30 arranged at the inspection position. As a result, it is possible to suppress an unnecessarily large force from being applied to the detection unit 30 arranged at the inspection position, and therefore, it is possible to suppress an unnecessarily large load from being applied to the detection unit 30.

Note that the other effects of the second embodiment are the same as those of the above-described first embodiment.

Third Embodiment

Figure 14:
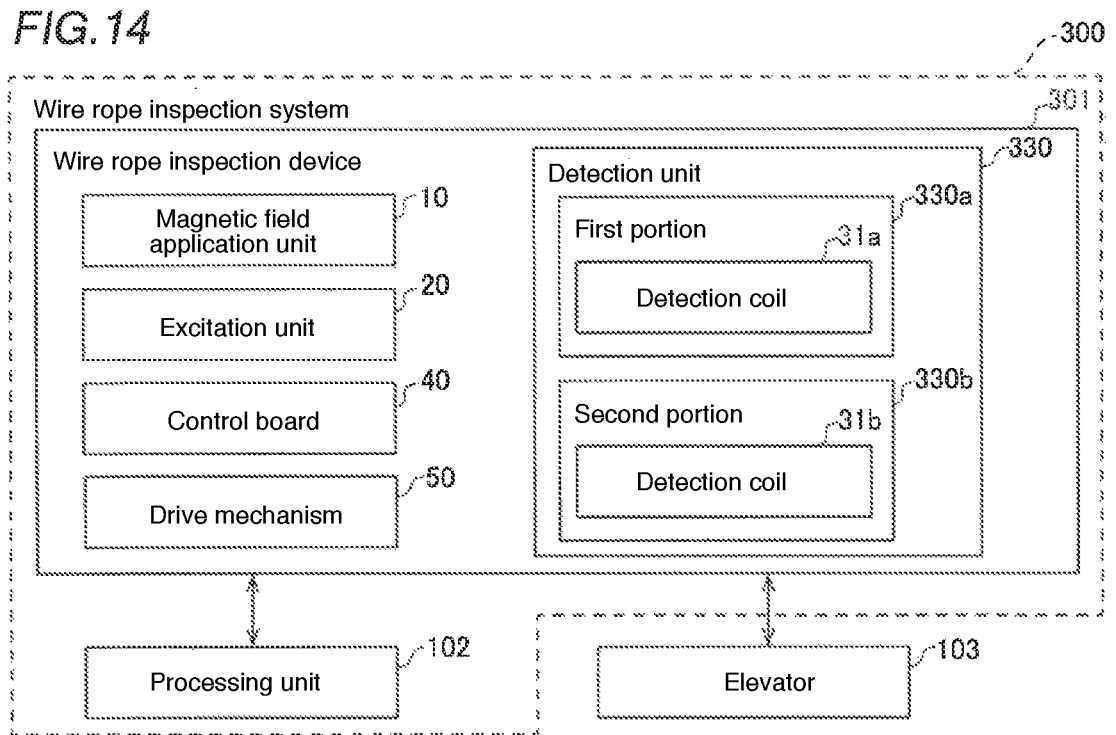
FIG. 14 is a block diagram showing an entire configuration of a wire rope inspection system according to a third embodiment.
Figure 15:
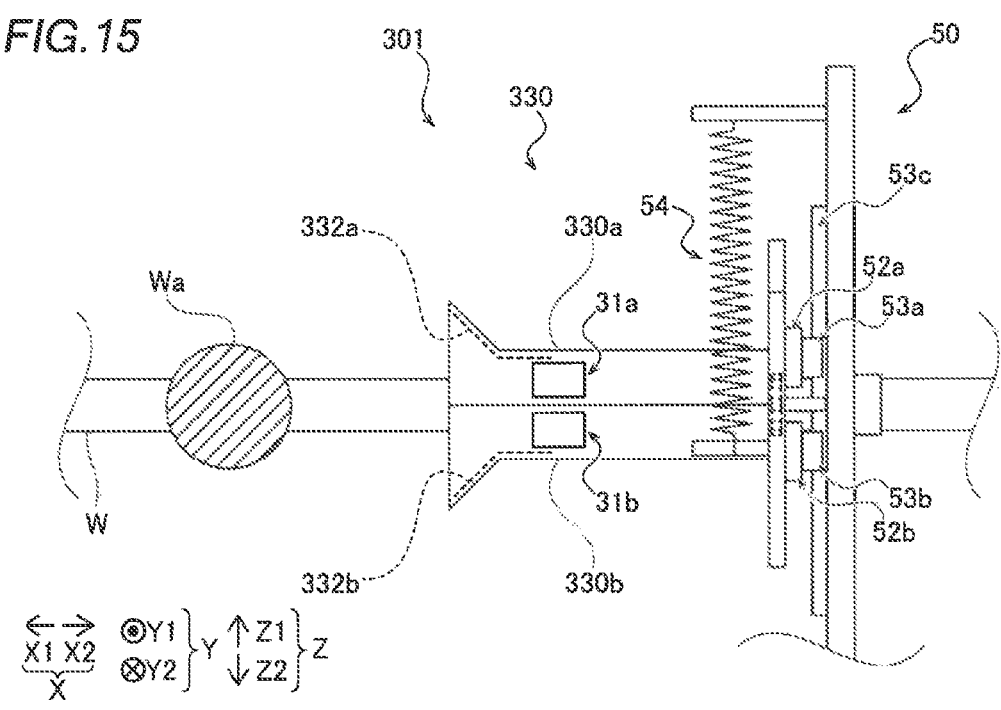
FIG. 15 is a diagram schematically illustrating the arrangement of a detection unit and a drive mechanism at the time of an inspection operation by a wire rope inspection device according to a third embodiment.
Figure 16:
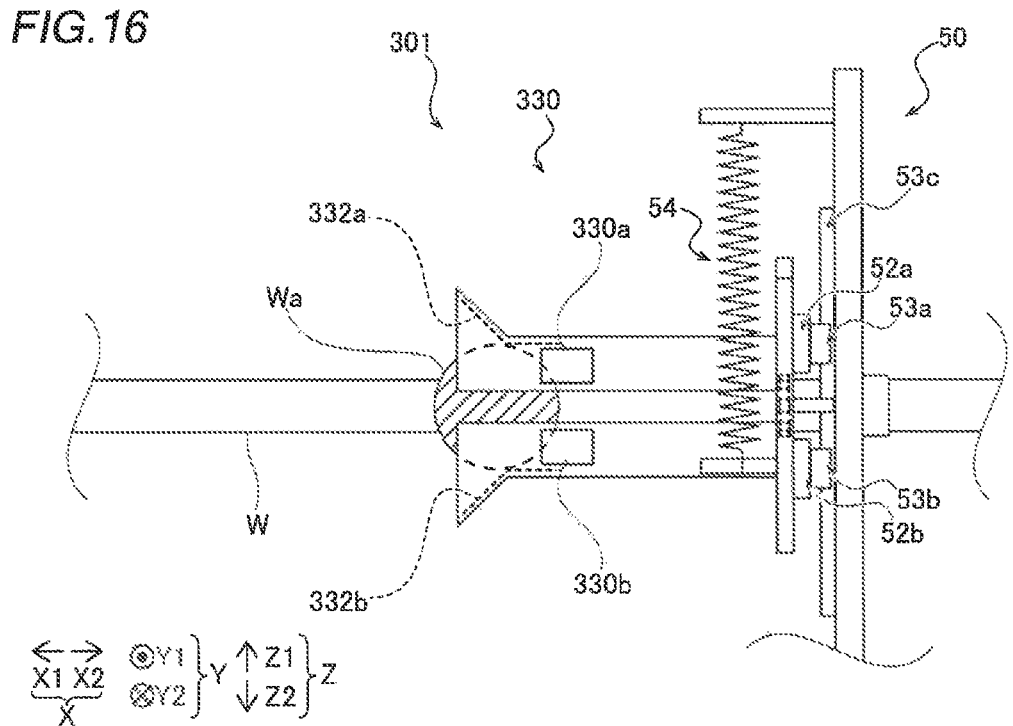
FIG. 16 is a diagram showing a movement of a detection unit due to a contact with a foreign matter.

With reference to FIGS. 14 to 16, the configuration of a wire rope inspection device 301 according to a third embodiment will be described. In this third embodiment, the first portion 330*a* and the second portion 330*b* each have the inclined surface 332*a* and the inclined surface 332*b*, respectively, on their surfaces facing the wire rope W. Note that in the figures, the same component as that of the first and second embodiments is denoted by the same reference numeral, and the descriptions thereof will be omitted.

(Configuration of Wire Rope Inspection System by Third Embodiment)

As shown in FIG. 14, the wire rope inspection system 300 according to the third embodiment is provided with a wire rope inspection device 301. The wire rope inspection device 301 includes a detection unit 330. The detection unit 330 includes a first portion 330*a* and a second portion 330*b*. The first portion 330*a* and the second portion 330*b* have a detection coil 31*a* and a detection coil 31*b*, respectively. The configuration of the detection coil 31*a* and 31*b* is the same as that of the first embodiment. The configuration for measuring the magnetic flux (magnetic field) in the wire rope W according to the third embodiment is the same as the first embodiment.

Further, as shown in FIG. 15, the wire rope inspection device 301 is provided with a drive mechanism 50 which is the same as that of the first embodiment. The first portion 330*a* and the second portion 330*b* of the detection unit 330 are held by the holding plate 52*a* and the holding plate 52*b* of the drive mechanism 50 in the same manner as in the first portion 30*a* and second portion 30*b* according to the first embodiment, respectively.

That is, in the same manner as in the detection unit 30 (the first portion 30*a* and the second portion 30*b*) according to the first embodiment, the detection unit 330 (the first portion 330*a* and the second portion 330*b*) is moved to the normal operation position by the drive unit 51 of the drive mechanism 50 and is urged to the inspection position by the urging unit 54 to be arranged to surround the wire rope W in a state of being positioned in a state of being in contact with each other at the inspection position.

Further, in the third embodiment, in the same manner as in the first embodiment, the detection unit 330 is configured to detect the magnetic flux in the moving wire rope W in a state in which the wire rope W is moving along the extending direction (X2-direction) of the wire rope W.

In the third embodiment, the first portion 330*a* and the second portion 330*b* have an inclined surface 332*a* and an inclined surface 332*b*, respectively, on the surface facing the wire rope W. Specifically, the inclined surface 332*a* is provided on the Z2-direction side surface of the first portion 330*a* provided on the Z1-direction side with respect to the wire rope W. The inclined surface 332*b* is provided on the Z1-direction side surface of the second portion 330*b* provided on the Z2-direction side with respect to the wire rope W.

Further, the first portion 330*a* and the second portion 330*b* are each provided with a groove such that the wire rope W is surrounded by the detection coil 31*a* and the detection coil 31*b* in a state of being in contact with each other.

The groove has a semicircular cross-section along the outer surface of the wire rope W. By arranging the first portion 330*a* and the second portion 330*b* at the inspection position in a state of being in contact with each other, a cylindrical (columnar) space in which the wire rope W is arranged is formed by the groove portions of the first portion 330*a* and the second portion 330*b*.

In this third embodiment, the inclined surfaces 332*a* and 332*b* are provided on the upstream side (X1-direction side) toward which the wire rope W approaches in the groove portions (the surface facing the wire rope W) of the first portion 330*a* and the second portion 330*b*.

Further, the inclined surface 332*a* and the inclined surface 332*b* are provided such that the upstream side (X1-direction side) thereof spreads in a direction away from the wire rope W in a state in which the first portion 330*a* and the second portion 330*b* are arranged at the inspection position in a state of being in contact with each other.

Specifically, the inclined surface 332*a* and the inclined surface 332*b* are provided such that the cross-sectional area of the cylindrical space formed by the groove portions of the first portion 330*a* and the second portion 330*b* gradually increases toward the X1-direction side. Therefore, the inclined surface 332*a* and the inclined surface 332*b* are provided such that the cylindrical space formed by the groove portions of the first portion 330*a* and the second portion 330*b* is expanded in a trumpet shape.

As shown in FIG. 16, the first portion 330*a* and the second portion 330*b* according to the third embodiment are configured to move in a direction away from each other (in a direction away from the wire rope W) by coming into contact with a foreign matter Wa adhered to the outer surface of the wire rope W in a state of being arranged at the inspection position. The foreign matter Wa is, for example, an oil (grease) adhering to the outer surface of the wire rope W.

Here, the first portion 330*a* and the second portion 330*b* are arranged at the inspection position in a state of being urged in a direction to approach each other by the elastic force of the urging unit 54. In a case where a foreign matter Wa adheres to the outer surface of the wire rope W moving from the X1-direction side toward the X2-direction side, the foreign matter Wa comes into contact with the inclined surface 332*a* of the first portion 330*a* and the inclined surface 332*b* of the second portion 330*b* arranged at the inspection position. When the foreign matter Wa comes into contact with the inclined surfaces 332*a* and 332*b*, the first portion 330*a* and the second portion 330*b* are forced to spread in a direction away from each other while resisting the elastic force of the urging unit 54.

In this case, the first portion 330*a* and the second portion 330*b* are moved linearly along the Z-direction by the linear guides 53*a* and 53*b* and the linear guide rail 53*c* of the drive mechanism 50. After the passing of the foreign matter Wa, the first portion 330*a* and the second portion 330*b* are urged by the elastic force of the urging unit 54 again and are arranged at the inspection position while the moving speed is attenuated by the damper unit 55.

Other configurations of the third embodiment are the same as those of the first embodiment.

(Effects of Third Embodiment)

In the third embodiment, the following effects can be obtained.

In the third embodiment, the detection unit 330 is configured to detect the magnetic flux in the moving wire rope W in a state in which the wire rope W is moving along the extending direction (X-direction) of the wire rope W. The first portion 330*a* and the second portion 330*b* have the inclined surfaces 332*a* and 332*b* which are arranged to surround the wire rope W at the inspection position and provided to extend in the directions (X1-direction side) away from the wire rope W of wire rope W on the surfaces facing the wire rope W.

By configuring as described above, in a case where the foreign matter Wa is adhering to the outer surface of the wire rope W moving from the upstream side with respect to the detection unit 330, the foreign matter Wa can be brought into contact with the inclined surface 332a and the inclined surface 332b provided to extend in the directions away from the wire rope W from the upstream side. Therefore, the foreign matter Wa moving from the upstream side of the wire rope W comes into contact with the inclined surface 332a and inclined surface 332b, thereby applying a force such that the first portion 330a and the second portion 330b are pushed apart.

Therefore, when the foreign matter Wa comes into contact with the detection unit 30, the first portion 330a and the second portion 330b of the detection unit 30 can be moved (escaped) in the direction away from the wire rope W. Consequently, in a case where the foreign matter Wa is adhering to the outer surface of the wire rope W which is the inspection target, it is possible to suppress that the large force is applied to the detection unit 330 (the detection coil 31a and the detection coil 31b) due to the contact with the foreign matter Wa, and therefore, it is possible to suppress the abnormality from occurring in the detection unit 330.

The other effects of the third embodiment are the same as those of the first embodiment.

[Modifications]

It should be understood that the embodiments disclosed here are examples in all respects and are not restrictive. The scope of the present invention is shown by the scope of the claims rather than the descriptions of the embodiments described above, and includes all changes (modifications) within the meaning and the scope equivalent to claims.

For example, in the first to third embodiments described above, an example is shown in which the first portion 30a (330a) and the second portion 30b (330b) are arranged on one side (X1-direction side) and the other side (X2-direction side) in a direction perpendicular to the extending direction of the wire rope W, but the present invention is not limited thereto. In the present invention, as a detection coil, it may be configured such that one coil formed on a flexible substrate such as a flexible substrate is adopted and the position of the detection unit to the wire rope is changed by deforming the one coil.

Further, in the first to third embodiments described above, an example is shown in which the first portion 30a (330a) and the second portion 30b (330b) are moved at an equal distance from the wire rope W, but the present invention is not limited thereto. For example, it may be configured such that the separation distance of the first portion 30a (330a) and the second portion 30b (330b) from the wire rope W is different from each other.

In addition, in the first to third embodiments described above, an example is shown in which the first portion 30a (330a) and the second portion 30b (330b) are arranged at the inspection position in a state of being in contact with each other, but the present invention is not limited thereto. For example, it may be configured such that the stopper member is provided separately from the first portion 30a (330a) and the second portion 30b (330b) and that the first portion 30a (330a) and the second portion 30b (330b) are arranged at the inspection position in a state of being in contact with the stopper member.

In the first and third embodiments described above, an example is shown in which the fixing unit 58 for fixing the detection unit 30 (330) arranged at the normal operation position is provided, but the present invention is not limited thereto. For example, it may be configured such that the detection unit 30 is fixed at the normal operation position by continuously applying the driving force by the drive unit 51, without providing the fixing unit 58.

In the first and third embodiments described above, an example is shown in which the moving speed of the detection unit 30 (330) is attenuated by the viscous resistance of the fluid filled in the damper unit 55 (attenuation unit), but the present invention is not limited thereto. For example, it may be configured such that the attenuation unit attenuates the moving speed by a frictional force.

Further, in the first and third embodiments described above, an example is shown in which the drive unit 51 which is a solenoid type drive unit is provided as a drive unit for moving the detection unit 30 (330) in a direction away from the wire rope W, and in the second embodiment, an example is shown in which the motor 251 is provided, but the present invention is not limited thereto. The present invention may include an actuator other than a solenoid type drive unit and a motor. For example, an actuator, such as, e.g., a pneumatic cylinder, a hydraulic cylinder, and a hydraulic cylinder, may be provided.

Further, in first and third embodiment described above, an example is shown in which the damper unit 55 has the gear portion 55a that rotates in a state of being engaged with the tooth portions of the rack portions 56a and 56b and attenuates the rotational speed of the gear portion 55a, but the present invention is not limited thereto. For example, a linearly moving cylindrical oil damper may be connected to each of the first portion 30a (330a) and the second portion 30b (330b).

Further, in the second embodiment described above, an example is shown in which the moving speed of the detection unit 30 is attenuated by rotating the motor 251 while limiting the speed in the other rotational direction (the u-direction) opposite to the one rotational direction (the v-direction) when the detection unit 30 is moved in a direction to approach the wire rope W by being urged to the urging unit 54, but the present invention is not limited thereto. For example, it may be configured such that the motor 251 idles when the detection unit 30 is moved to approach the wire rope W by being urged by the urging unit 54 by providing a damper unit to attenuate the moving speed. In such a case, a one-way clutch may not be provided.

Further, in the first to third embodiment described above, an example is shown in which the position detection unit 57 of the mechanical switch for detecting that the detection unit 30 (330) is arranged at the normal operation position is provided, but the present invention is not limited to this. For example, the position detection unit 57 may be configured by a non-contact optical sensor rather than a mechanical switch. Further, in a case where the drive unit is a motor, it may be configured such that it is controlled to determine that the detection unit 57 has been arranged at the normal operation position when the motor is rotated by a predetermined number of rotations by controlling the number of rotations without providing the position detection unit 57.

Further, in the first to third embodiments described above, an example is shown in which the wire rope W of the elevator 103 is inspected, but the present invention is not limited to this. For example, it may be configured to inspect a wire rope other than the wire rope of the elevator, such as, e.g., the wire rope of a crane or a ropeway.

Further, in the first to third embodiments described above, an example is shown in which the magnetic flux in the wire rope W is detected by a total magnetic flux method, but the present invention is not limited thereto. For example, the detection unit 30 (330) may be configured to detect the magnetic leakage flux from the outer surface of the wire rope W.

Further, in the first to third embodiments described above, an example is shown in which the two detection coils 31a and 31b of the detection unit 30 (330) are each configured by an independent straddle-type coil (saddle-type coil), but the present invention is not limited thereto. For example, it may be configured such that the detection unit 30 (330) forms a solenoidal coil that winds around the wire rope W by combining the first portion 30a (330a) and the second portion 30b (330b).

Further, in the first to third embodiments described above, an example is shown in which the excitation coil 21 is provided to wind the outer side of the detection coils 31a and 31b with respect to the wire rope W, the present invention is not limited thereto. For example, the excitation unit 20 and the detection unit 30 (330) may be arranged side by side along the extending direction of the wire rope W.

In the first to third embodiments described above, an example is shown in which the magnetic field application unit 10 and the excitation unit 20 are fixed to the housing 101a, and the detection unit 30 (330) is movably fixed to the drive mechanism 50, but the present invention is not limited thereto. For example, not only the detection unit 30 (330) but also the magnetic field application unit 10 or the excitation unit 20 may be configured to be movable so as to change the distance from the wire rope W at the time of the inspection operation and at the time of the normal operation.

Further, in the first to third embodiments described above, an example is shown in which the detection signal acquired by the detection unit 30 (330) of the wire rope inspection device 101 (201, 301) is outputted to the outside of the device (the processing device 102) via the communication unit 43, but the present invention is not limited thereto. For example, the wire rope inspection device may be configured to notify the inspection operator of the detection result (inspection result) based on the signal from the detection unit by providing a notification unit or a display unit.

Further, in the first to third embodiments described above, an example is shown in which the magnetic field application unit 10a and the magnetic field application unit 10b arranged to face each other across the wire rope W are arranged to face such that the N-poles are faced toward the wire rope W, but the present invention is not limited thereto. For example, two magnetic field application units may be arranged such that the N-pole and the S-pole face the wire rope W.

Further, the two magnetic field application units may be configured such that the N-pole and the S-pole are arranged along the extending direction of the wire rope W, rather than the direction facing each other. In this case, the two magnetic field application units may be the same or different orientations. Further, the magnetic field application unit may be arranged to apply the magnetic field in a direction inclined obliquely from the direction parallel to the extending direction of the wire rope W. Further, one magnetic field application unit may be arranged on one side in the direction intersecting the extending direction of the wire rope W. Further, the magnetic flux may be detected without aligning the magnetic field without providing the magnetic field application unit.

Further, in the first to third embodiments described above, an example is shown in which the magnetic field application unit 10 is configured by a permanent magnet, but the present invention is not limited thereto. For example, the magnetic field application unit may be configured by an electromagnet.

Further, in the first to third embodiments described above, an example is shown in which the detection coils 31a and 31b are provided to each of the four wire ropes W, but the present invention is not limited thereto. For example, the detection coil may be configured to detect the magnetic flux of 1 or more and 3 or less wire ropes W, or may be configured to detect the magnetic flux of 5 or more wire ropes W. Further, it may be configured to detect magnetic fluxes of a plurality of wire ropes W by one detection coil.

Further, in the first to third embodiments described above, an example is shown in which the distance of the detection unit 30(300) from the wire rope W is changed by switching the operation mode of the elevator 103 based on the input operation to the processing device 102, but the present invention is not limited thereto. In the present invention, it may be configured such that the distance of the detection unit 30(300) from the wire rope W is changed based on the input operation to a button or the like provided to the wire rope inspection device by the operator.

Further, in the third embodiment described above, an example is shown in which the first portion 330a and the second portion 330b of the detection unit 330 are provided with the inclined surface 332a and 332b that come into contact with a foreign matter Wa, but the present invention is not limited thereto. For example, an inclined surface may be provided in either one of the first portion 330a and the second portion 330b of the detection unit 330.

Further, in the third embodiment described above, an example is shown in which the detection unit 330 is moved by the drive unit 51 of a solenoid type drive unit in the same manner as in the first embodiment and that the detection unit 330 is provided with the inclined surfaces 332a and 332b that come into contact with a foreign matter, but the present invention is not limited thereto. For example, it may be configured to move the detection unit by a motor in the same manner as in the second embodiment, and also configured to provide an inclined surface at the detection unit.

Further, in the third embodiment described above, an example is shown in which the first portion 330a and the second portion 330b of the detection unit 330 are moved such that the inclined surfaces 332a and 332b are moved away from the wire rope W by coming into contact with the foreign matter Wa adhering to the outer surface of the wire rope W, but the present invention is not limited thereto. For example, it may be configured such that the first portion and the second portion are each moved in a direction away from the wire rope W not only by the contact to a foreign matter Wa adhering to the outer surface of wire rope W but also by the contact to the popped-out wire piece of a wire rope W from the outer surface of the wire rope W, or by the contact to an abnormal portion, such as, e.g., kink.

[Aspects]

It will be understood by those skilled in the art that the above-described exemplary embodiments are concrete examples of the following aspects.

(Item 1)

A wire rope inspection device comprising:

an excitation unit configured to apply a magnetic flux to a wire rope which is an inspection target;

a detection unit configured to detect a magnetic flux in the wire rope to which the magnetic flux has been applied by the excitation unit;

an urging unit configured to urge the detection unit in a direction to approach the wire rope by an elastic force to an inspection position at which the detection unit is arranged at a time of an inspection operation for inspecting the wire rope; and a drive unit configured to move the detection unit in a direction away from the wire rope to a normal operation position at which the detection unit is arranged at a time of a normal operation.

(Item 2)

The wire rope inspection device as recited in the above-described Item 1, wherein the detection unit includes a first portion to be arranged on one side in a direction perpendicular to an extending direction of the wire rope and a second portion to be arranged on the other side thereof, and wherein the urging unit is configured to urge the first portion and the second portion to approach each other by the elastic force to the inspection position.

(Item 3)

The wire rope inspection device as recited in the above-described Item 2, wherein the drive unit is configured to move the first portion and the second portion such that the first portion and the second portion are equally spaced from the wire rope.

(Item 4)

The wire rope inspection device as recited in the above-described Item 2 or 3, wherein the first portion and the second portion are configured to be arranged at the inspection position in a state in which the first portion and the second portion are positioned by coming into contact with each other by being urged by the urging unit.

(Item 5)

The wire rope inspection device as recited in any one of the above-described Items 2 to 4, wherein the detection unit is configured to detect the magnetic flux in the wire rope which is being moved in a state in which the wire rope is moving along the extending direction of the wire rope, and wherein the first portion and the second portion are configured to be arranged to surround the wire rope at the inspection position, and the first portion and the second portion each have an inclined surface on a surface facing the wire rope, the inclined surface being formed to expand in a direction away from the wire rope on an upstream side of the wire rope.

(Item 6)

The wire rope inspection device as recited in any one of the above-described Items 1 to 5, further comprising:

a fixing unit configured to fix the detection unit in a state of being arranged at the normal operation position.

(Item 7)

The wire rope inspection device as recited in any one of the above-described Items 1 to 6, further comprising:

an attenuation unit configured to attenuate a moving speed of the detection unit when the detection unit moves in a direction to approach the wire rope by being urged by the urging unit.

(Item 8)

The wire rope inspection device as recited in the above-described Item 7, wherein the drive unit includes a solenoid type drive unit that moves the detection unit in a direction away from the wire rope by generating a magnetic field by a current, and wherein the attenuation unit includes a damper unit that attenuates the moving speed of the detection unit by viscous resistance of a fluid filled in the damper unit when the detection unit moves in a direction to approach the wire rope by being urged by the urging unit.

(Item 9)

The wire rope inspection device as recited in the above-described Item 8, further comprising:

a rack portion having a tooth portion and extending linearly, wherein the damper unit is configured to have a gear portion that rotates in a state of being engaged with the tooth portion of the rack portion and attenuate a rotational speed of the gear portion, and wherein the rack portion is configured to have one end fixed to the detection unit and the other end engaged with the gear portion of the damper unit.

(Item 10)

The wire rope inspection device as recited in the above-described Item 7, wherein the drive unit includes a motor that moves the detection unit in a direction away from the wire rope by rotating in one rotational direction, and wherein the motor is configured to be speed-controllable and serve as the attenuation unit for attenuating the moving speed of the detection unit by rotating while limiting a speed in a rotational direction opposite to the one rotational direction when the detection unit moves in a direction to approach the wire rope by being urged by the urging unit.

(Item 11)

The wire rope inspection device as recited in the above-described Item 10, further comprising:

a one-way clutch connected to a rotation shaft of the motor, wherein the one-way clutch is configured to rotate together with the rotation shaft of the motor when the motor is applying a driving force to the detection unit in a direction that the detection unit moves away from the wire rope and idle with respect to the rotation shaft of the motor when the motor is applying a driving force to the detection unit in a direction that the detection unit approaches the wire rope.

(Item 12)

The wire rope inspection device as recited in any one of the above-described Items 1 to 11, further comprising:

a position detection unit configured to detect that the detection unit has been arranged at the normal operation position.

(Item 13)

The wire rope inspection device as recited in any one of the above-described Items 1 to 12, wherein the detection unit is configured to detect the magnetic flux in the wire rope that is being moved in a state in which the wire rope provided on an elevator is moving along the extending direction of the wire rope by driving the elevator, wherein the urging unit is configured to urge the detection unit to the detection position at which the detection unit is arranged at a time of the inspection operation of the elevator at which the moving speed of the wire rope relative to the detection portion is relatively low, and wherein the drive unit is configured to move the detection unit to the normal operation position at which the detection unit is arranged at a time of the normal operation of the elevator at which the moving speed of the wire rope relative to the detection unit is relatively high.

(Item 14)

The wire rope inspection device as recited in any one of the above-described Items 1 to 13, further comprising:

a magnetic field application unit configured to apply a magnetic field to the wire rope in advance to align a direction of magnetization of the wire rope, wherein the excitation unit includes an excitation coil for exciting the magnetization of the wire rope after the magnetic field is applied by the magnetic field application unit in advance, wherein the detection unit includes a detection coil wound around the wire rope along the extending direction of the wire rope to detect the magnetic flux in the wire rope in which a state of the magnetization has been excited by the excitation coil, by a total magnetic flux method, wherein the urging unit is configured to urge the detection coil to the inspection position by the elastic force, and wherein the drive unit is configured to move the detection coil to the normal operation position.

The invention claimed is:

1. A wire rope inspection device comprising:

an excitation unit configured to apply a first magnetic flux to a wire rope which is an inspection target;

a detection unit configured to detect a second magnetic flux of the wire rope to which the first magnetic flux has been applied by the excitation unit;

an urging unit configured to move the detection unit in a direction to approach the wire rope by urging the detection unit by an elastic force to an inspection position at which the detection unit is arranged at a time of an inspection operation for inspecting the wire rope; and a drive unit configured to move the detection unit in a direction away from the wire rope to a normal operation position at which the detection unit is arranged at a time of a normal operation at which no inspection is performed.

2. The wire rope inspection device as recited in claim 1, wherein the detection unit includes a first portion to be arranged on one side in a direction perpendicular to an extending direction of the wire rope and a second portion to be arranged on the other side thereof, and wherein the urging unit is configured to urge the first portion and the second portion to approach each other by the elastic force to the inspection position.

3. The wire rope inspection device as recited in claim 2, wherein the drive unit is configured to move the first portion and the second portion such that the first portion and the second portion are equally spaced from the wire rope.

4. The wire rope inspection device as recited in claim 2, wherein the first portion and the second portion are configured to be arranged at the inspection position in a state in which the first portion and the second portion are positioned by coming into contact with each other by being urged by the urging unit.

5. The wire rope inspection device as recited in claim 2, wherein the detection unit is configured to detect the second magnetic flux of the wire rope which is being moved in a state in which the wire rope is moving relative to the detection unit along the extending direction of the wire rope, and wherein the first portion and the second portion are configured to be arranged to surround the wire rope at the inspection position, and the first portion and the second portion each have an inclined surface on a surface facing the wire rope, the inclined surface being formed to expand in a direction away from the wire rope on an upstream side of the wire rope.

6. The wire rope inspection device as recited in claim 1, further comprising:

a fixing unit configured to fix the detection unit in a state of being arranged at the normal operation position.

7. The wire rope inspection device as recited in claim 1, further comprising:

a position detection unit configured to detect that the detection unit has been arranged at the normal operation position.

8. The wire rope inspection device as recited in claim 1, wherein the detection unit is configured to detect the second magnetic flux of the wire rope that is being moved in a state in which the wire rope provided on an elevator is moving along an extending direction of the wire rope by driving the elevator, wherein the urging unit is configured to urge the detection unit to the inspection position at which the detection unit is arranged at a time of the inspection operation of the elevator at which a moving speed of the wire rope relative to the detection unit is relatively low, and wherein the drive unit is configured to move the detection unit to the normal operation position at which the detection unit is arranged at a time of the normal operation of the elevator at which the moving speed of the wire rope relative to the detection unit is relatively high.

9. A wire rope inspection device comprising:

an excitation unit configured to apply a first magnetic flux to a wire rope which is an inspection target;

a detection unit configured to detect a second magnetic flux of the wire rope to which the first magnetic flux has been applied by the excitation unit;

an urging unit configured to urge the detection unit in a direction to approach the wire rope by an elastic force to an inspection position at which the detection unit is arranged at a time of an inspection operation for inspecting the wire rope;

a drive unit configured to move the detection unit in a direction away from the wire rope to a normal operation position at which the detection unit is arranged at a time of a normal operation at which no inspection is performed; and an attenuation unit configured to attenuate a moving speed of the detection unit when the detection unit moves in a direction to approach the wire rope by being urged by the urging unit.

10. The wire rope inspection device as recited in claim 9, wherein the drive unit includes a solenoid type drive unit that moves the detection unit in a direction away from the wire rope by generating a magnetic field by a current, and wherein the attenuation unit includes a damper unit that attenuates the moving speed of the detection unit by viscous resistance of a fluid filled in the damper unit when the detection unit moves in a direction to approach the wire rope by being urged by the urging unit.

11. The wire rope inspection device as recited in claim 10, further comprising:

a rack portion having a tooth portion and extending linearly along a direction perpendicular to an extending direction of the wire rope, wherein the damper unit is configured to have a gear portion that rotates in a state of being engaged with the tooth portion of the rack portion and attenuate a rotational speed of the gear portion, and wherein the rack portion is configured to have one end fixed to the detection unit and the other end engaged with the gear portion of the damper unit.

12. The wire rope inspection device as recited in claim 9, wherein the drive unit includes a motor that moves the detection unit in a direction away from the wire rope by rotating in one rotational direction, and wherein the motor is configured to be speed-controllable and serve as the attenuation unit for attenuating the moving speed of the detection unit by rotating while limiting a speed in a rotational direction opposite to the one rotational direction when the detection unit moves in a direction to approach the wire rope by being urged by the urging unit.

13. The wire rope inspection device as recited in claim 12, further comprising:

a one-way clutch connected to a rotation shaft of the motor, wherein the one-way clutch is configured to rotate together with the rotation shaft of the motor when the motor is applying a driving force to the detection unit in a direction that the detection unit moves away from the wire rope and idle with respect to the rotation shaft of the motor when the motor is applying a driving force to the detection unit in a direction that the detection unit approaches the wire rope.

14. A wire rope inspection device comprising:

an excitation unit configured to apply a first magnetic flux to a wire rope which is an inspection target;

a detection unit configured to detect a second magnetic flux of the wire rope to which the first magnetic flux has been applied by the excitation unit;

an urging unit configured to urge the detection unit in a direction to approach the wire rope by an elastic force to an inspection position at which the detection unit is arranged at a time of an inspection operation for inspecting the wire rope;

a drive unit configured to move the detection unit in a direction away from the wire rope to a normal operation position at which the detection unit is arranged at a time of a normal operation at which no inspection is performed; and a magnetic field application unit configured to apply a magnetic field to the wire rope in advance to align a direction of magnetization of the wire rope before the first magnetic flux is applied by the excitation unit, wherein the excitation unit includes an excitation coil for exciting the magnetization of the wire rope after the magnetic field is applied by the magnetic field application unit in advance, wherein the detection unit includes a detection coil wound around the wire rope along an extending direction of the wire rope to detect the second magnetic flux in the wire rope in which a state of the magnetization has been excited by the excitation coil, by a total magnetic flux method that measures the second magnetic flux inside the wire rope, wherein the urging unit is configured to urge the detection coil to the inspection position by the elastic force, and wherein the drive unit is configured to move the detection coil to the normal operation position.

* * * * *